US008955398B2

(12) United States Patent  
Loreau

(10) Patent No.: US 8,955,398 B2
(45) Date of Patent: Feb. 17, 2015

(54) INDIVIDUAL TENSIOMETER FOR MEASURING TENSION IN A STRING

(76) Inventor: Eric Loreau, Les Herbiers (FR)

( * ) Notice: Subject to any disclaimer, the term of this patent is extended or adjusted under 35 U.S.C. 154(b) by 297 days.

(21) Appl. No.: 13/578,692

(22) PCT Filed: Mar. 3, 2011

(86) PCT No.: PCT/FR2011/050449
§ 371 (c)(1),
(2), (4) Date: Aug. 13, 2012

(87) PCT Pub. No.: WO2011/110777
PCT Pub. Date: Sep. 15, 2011

(65) Prior Publication Data
US 2012/0312101 A1     Dec. 13, 2012

(30) Foreign Application Priority Data

Mar. 8, 2010 (FR) .................................. 10 00919
Apr. 20, 2010 (FR) .................................. 10 52994
Mar. 3, 2011 (FR) .................................. 11 51730

(51) Int. Cl.
*A63B 51/00* (2006.01)
*G01L 5/10* (2006.01)
(52) U.S. Cl.
CPC ............... *A63B 51/005* (2013.01); *G01L 5/102* (2013.01); *A63B 2220/24* (2013.01); *A63B 2220/54* (2013.01); *A63B 2220/58* (2013.01); *A63B 2220/83* (2013.01)
USPC ......................................... 73/862.43; 73/828
(58) Field of Classification Search
USPC ........................... 73/159, 160, 862.42–862.44
See application file for complete search history.

(56) References Cited

U.S. PATENT DOCUMENTS

| 2,249,839 | A | * | 7/1941 | Lessmann ....................... 72/12.4 |
| 3,831,442 | A | | 8/1974 | Cummins et al. |
| 3,879,999 | A | * | 4/1975 | Saxl .......................... 73/862.471 |
| 4,309,910 | A | | 1/1982 | Walker |
| 5,461,929 | A | * | 10/1995 | Jordan ............................. 73/831 |
| 5,481,926 | A | | 1/1996 | Manson |
| 2003/0027670 | A1 | * | 2/2003 | van der Pols ................. 473/557 |
| 2007/0295187 | A1 | * | 12/2007 | Longo et al. .................... 84/313 |
| 2009/0215558 | A1 | * | 8/2009 | Bothwell ....................... 473/540 |

FOREIGN PATENT DOCUMENTS

DE     35 32 767 A1     3/1987
DE     19521517 C1     10/1996

OTHER PUBLICATIONS

Hinrichsmeyer, DE-3532767-A1, Mar. 19, 1987, EPO, 7 pages.*
International Search Report, dated Dec. 28, 2011, from corresponding PCT application.

* cited by examiner

*Primary Examiner* — Max Noori
(74) *Attorney, Agent, or Firm* — Young & Thompson

(57) ABSTRACT

An individual tension meter (1) for measuring tension in a racquet string (9), includes a graspable body (10) and a stress member (2) for stressing the string (9) that are movable relative to each other by pivoting, elastically deformable return elements (3) configured to urge the graspable body (10) and the stress member (2) relative to each other back into a neutral angular position, measurement elements for measuring a magnitude representative of the relative pivoting between the graspable body (10) and the stress member (2), and computation elements for computing the tension of the string as a function of the measured magnitude. The graspable body (10) and the stress member (2) have a first possibility of pivoting relative to each other in a first direction and a second possibility of pivoting relative to each other in a second direction opposite from the first direction.

19 Claims, 11 Drawing Sheets

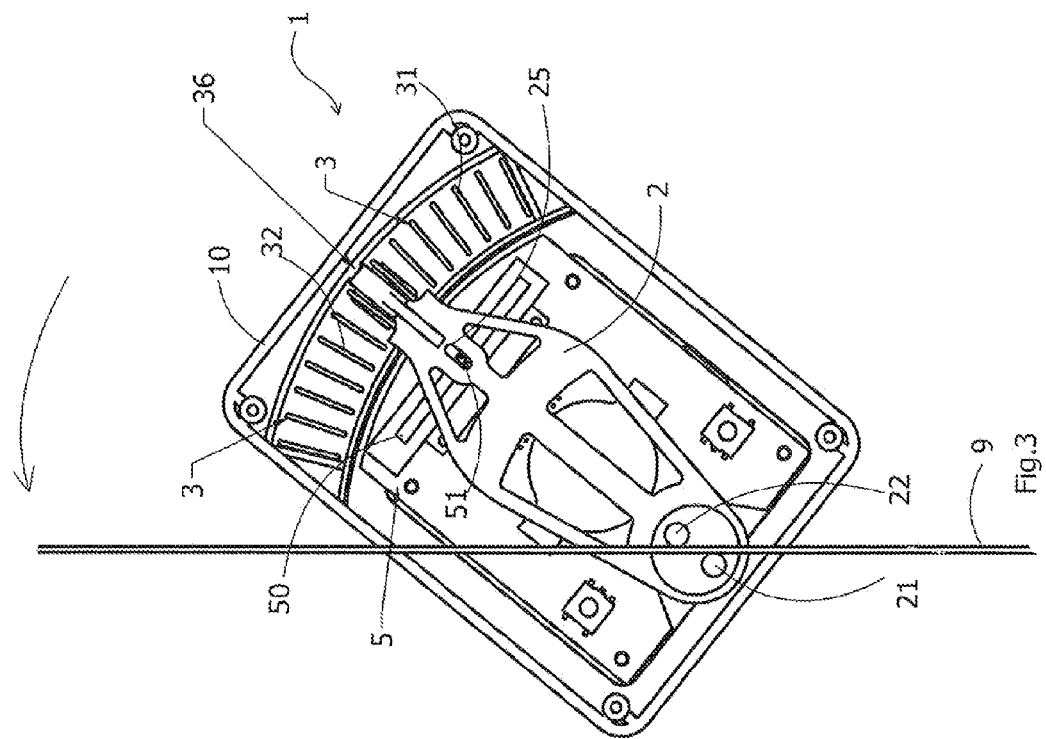
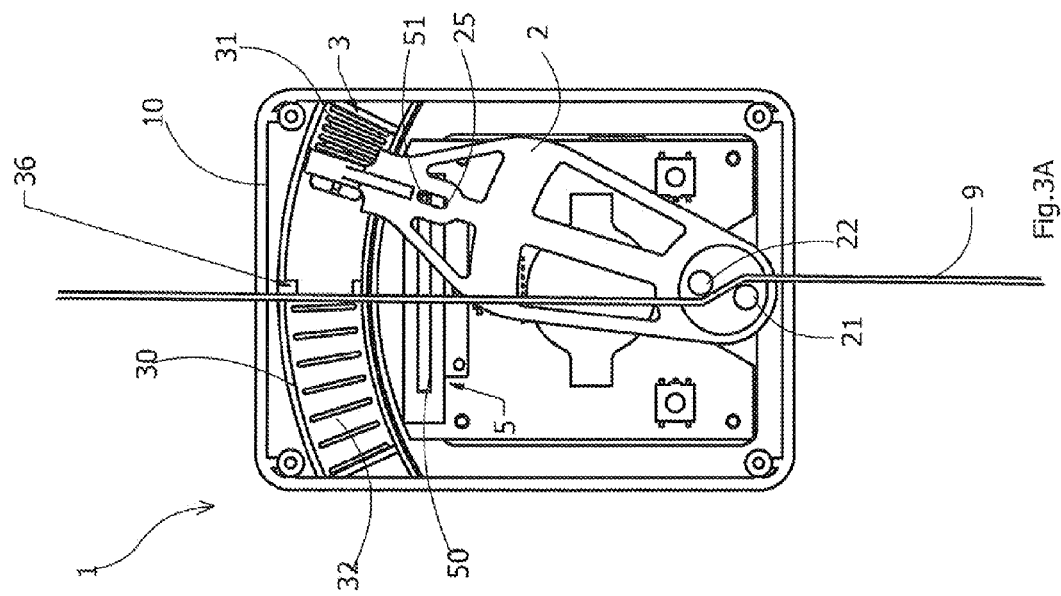

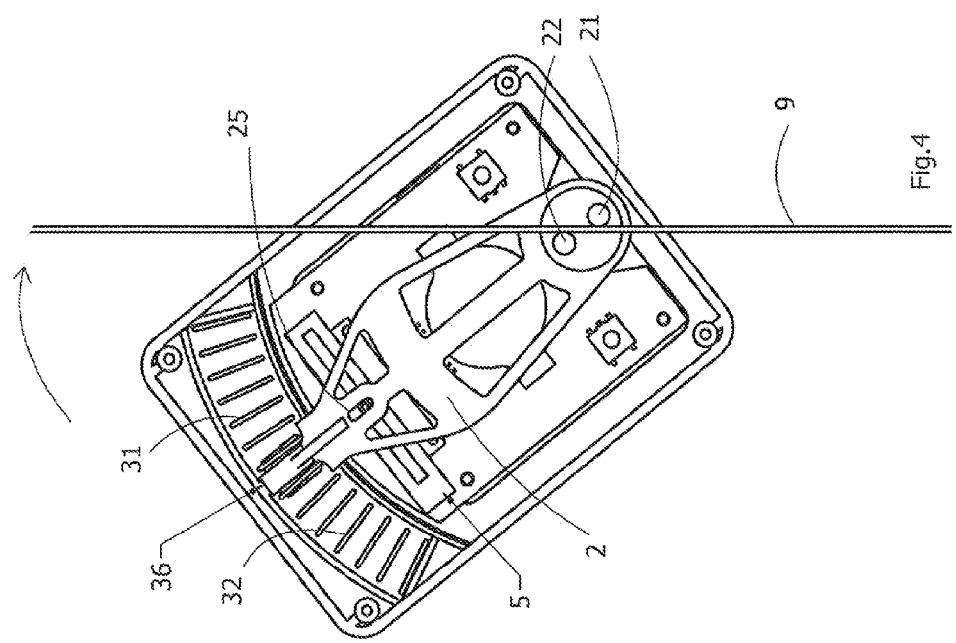
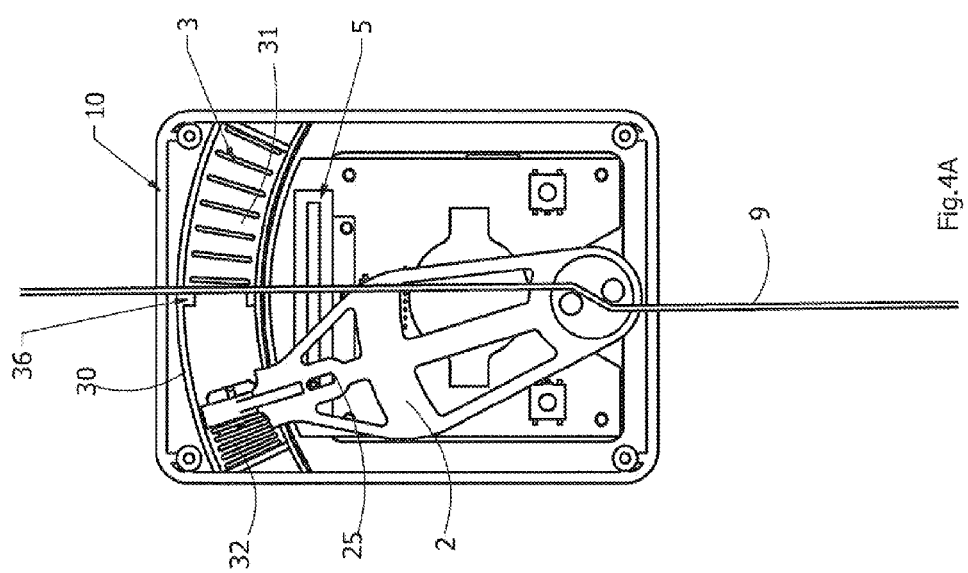

//<br>

INDIVIDUAL TENSIOMETER FOR MEASURING TENSION IN A STRING

BACKGROUND OF THE INVENTION

1. Field of the Invention

The present invention relates generally to instruments for measuring tension for a filamentary element of the string type.

The invention relates more particularly to an individual tension meter for measuring tension in a racquet string, said tension meter comprising:

- a body, referred to as the "graspable body", suitable for being taken hold of in the hand;
- a stress member for stressing the string by deforming said string, said stress member including at least two bearing elements spaced apart from each other, such as studs, fingers or prongs, positionable on either side of an individual string;
- said graspable body and said stress member being movable relative to each other substantially in a pivotal relative movement;
  - elastically deformable return means connected to the graspable body and to the stress member for stressing the string, and configured to urge the graspable body and the stress member relative to each other back into a given angular position referred to as the "neutral position";
  - measurement means for measuring a magnitude representative of the relative pivoting between the graspable body and the stress member; and
  - computation means for computing the tension of the string as a function of said measured magnitude.

2. Description of the Related Art

A tension measurement device such as the device described above is known from the state of the art, and in particular from Document U.S. Pat. No. 5,481,926. In that document, the graspable body is connected via a traction spring to the stress member for stressing the string. For measuring the tension of the string, the graspable body is turned until a reference portion of the stress member comes into register with the string. The tension of the string is then determined on the basis of the relative pivoting angle obtained between the stress member and the graspable body following pivoting of the graspable body.

Said relative angle corresponds to an elongation of the helical spring as stressed in traction. The tauter the string, the larger the relative angle between the graspable body and the stress member and the more the spring is stressed in traction. Conversely, the slacker the string, the smaller the relative angle and the less the spring is stressed in traction.

However, it is observed that the tension meter described in Document U.S. Pat. No. 5,481,926 operates in only one pivoting direction of the graspable body corresponding to the direction in which the spring can be lengthened. Such a solution therefore poses problems for left-handers when the tension meter is designed for right-handers, and vice versa.

In addition, in Document U.S. Pat. No. 5,481,926, the tension of a string is determined on the basis of reading graduations provided on a corresponding dial and corresponding to various values of relative angle between the graspable body and the stress member, which makes that tension meter awkward to use.

Like the tension meter described in Document U.S. Pat. No. 5,481,926, the tension meters described in Documents U.S. Pat. No. 3,831,442, U.S. Pat. No. 4,309,910, and DE 35 32 767 are not designed to be usable both by right-handers and by left-handers.

BRIEF SUMMARY OF THE INVENTION

An object of the present invention is to propose a tension meter that is easy to manipulate both for a left-hander and for a right-hander.

Another object of the present invention is to propose a robust tension meter that offers reliable and accurate tension measurement.

Another object of the present invention is to propose a tension meter that enables the user to determine the tension of a string easily and quickly.

To this end, the invention provides an individual tension meter for measuring tension in a racquet string, said tension meter comprising:

- a body, referred to as the "graspable body", suitable for being taken hold of in the hand;
- a stress member for stressing the string by deforming said string, said stress member including at least two bearing elements spaced apart from each other, such as studs, fingers or prongs, positionable on either side of an individual string;
- said graspable body and said stress member being movable relative to each other substantially in a pivotal relative movement;
  - elastically deformable return means connected to the graspable body and to the stress member for stressing the string, and configured to urge the graspable body and the stress member relative to each other back into a given angular position referred to as the "neutral position";
  - measurement means for measuring a magnitude representative of the relative pivoting between the graspable body and the stress member; and
  - computation means for computing the tension of the string as a function of said measured magnitude;
- said tension meter being characterized in that the graspable body and the stress member have two possibilities of pivoting relative to each other and relative to said neutral position, namely a first possibility of pivoting in a first direction and a second possibility of pivoting in a second direction opposite from the first direction.

For any given pivot angle of the graspable body starting from an initial position in which both bearing elements of the stress member are bearing against the string, the relative pivoting between the graspable body and the stress member, or indeed the deformation of said return means is a function of the internal or initial tension of the string, i.e. of the tension of the string in the absence of stress on said string. The return means connect the graspable body to the stress member so that said return means limit the relative pivoting between the graspable body and the stress member by acting against said relative pivoting. As a result, the measurement of said relative pivoting corresponds to a measurement of the deformation of the return means that itself depends on the tension of the string. Thus, the measurement of the relative pivoting between the graspable body and the stress member makes it possible to determine the tension of the string.

By means of the possibility offered by the tension meter of the invention of causing the graspable body to pivot relative to the stress member in either direction and with reference to a neutral position, said tension meter is easy to manipulate both for a left-hander and for a right-hander. The relative pivoting between the graspable body and the stress member, in either direction, allowed by the return means deforming, can be detected in both directions by means of the measurement means, as described in detail below.

As described in detail below, said magnitude representative of the relative pivoting between the graspable body and the stress member may be a characteristic of an electrical signal associated with at least one "resistive" element or system having variable resistance that varies as a function of the relative pivoting between the graspable body and the stress member. In particular, it is possible to make provision to measure a voltage associated with said variable resistance element or system, said voltage varying as a function of the resistance value of said resistive element or system and thus as a function of the relative pivoting between the graspable body and the stress member. Said computation means can then convert the measured voltage value into a string tension value by using a mathematical formula and/or nomographs.

According to an advantageous characteristic of the invention, said measurement means comprise first measurement means for measuring a magnitude representative of the relative pivoting between the graspable body and the stress member in said first direction relative to said neutral position, and second measurement means for measuring a magnitude representative of the relative rotation between the graspable body and the stress member in said second direction relative to said neutral position.

Preferably, said first and second measurement means are common means.

According to an advantageous characteristic of the invention, said return means have a first possibility of deforming in a direction corresponding to said first direction of pivoting of the graspable body relative to the stress member and a second possibility of deforming in a direction corresponding to said second direction of pivoting of the graspable body relative to the stress member.

According to an advantageous characteristic of the invention, relative to each other, and on either side of the neutral position, the graspable body and the stress member have an angular movement stroke of not less than 10°.

According to an advantageous characteristic of the invention, in the state in which the two bearing elements of said stress member are positioned on either side of the string, said return means and the stress member are arranged in such a manner that the midplane passing through said bearing elements astride the string forms, in the neutral position, a plane of symmetry for said return means and/or a plane in which said return means extend.

According to an advantageous characteristic of the invention, when the graspable body pivots relative to the stress member, in one direction, through a given angle relative to the neutral position, said return means have, in absolute terms, a deformation stroke that is substantially identical to the deformation stroke that they have when the graspable body pivots in the other direction relative to the stress member through said given angle relative to the neutral position.

Having deformation properties that are substantially identical in either direction of pivoting of the graspable body makes it possible to simplify the design and/or the configuration of the computation means, because the formula for computing the string tension as a function of the measured magnitude in a given direction of pivoting is similar, or indeed identical, to the formula for computing the string tension as a function of the measured magnitude in the opposite direction of pivoting.

According to an advantageous characteristic of the invention, said measurement means comprise a linear potentiometer having a variable linear resistive element and an adjustment member or "slide" for adjusting said resistive element, said slide being movable along at least a portion of said variable linear resistive element, said variable linear resistive element and said slide being coupled one to the graspable body, and the other to the stress member.

Said measurement means comprise a linear potentiometer having its electrical resistance modified when the graspable body is turned in either direction, thereby making it possible to measure the relative pivoting between the graspable body and the stress member in both directions.

The use of a linear potentiometer makes it possible to obtain a robust tension meter of simplified design that offers reliable and accurate tension measurement.

Such a design for the tension meter using a linear potentiometer makes it possible to limit the thickness of the tension meter. The slide has a small size that makes it possible to obtain a tension meter of small thickness. Said thickness corresponds to the dimension of the tension meter in a direction parallel to the axis of pivoting of the graspable body relative to the stress member.

The use of a linear potentiometer makes it easy to vary the resistance as a function of the pivoting of the graspable body relative to the stress member by coupling the slide and the linear resistive element, one to the graspable body and the other to the stress member.

Modifying the electrical resistance of the potentiometer as a function of the relative pivoting between the graspable body and the stress member makes it possible to supply to the computation means a magnitude representative of the relative pivoting between the graspable body and the stress member. Said magnitude may be a voltage measured across a terminal corresponding to the ground of the potentiometer and a terminal corresponding to the slide of the potentiometer. Said magnitude can be processed by said computation means to determine the corresponding tension of the string. It is possible, in particular, to make provision to filter and/or to amplify the signal corresponding to said magnitude and acquired by the computation means.

According to an advantageous characteristic of the invention, said tension meter further comprises activation and deactivation means suitable for activating and deactivating said computation means as a function of the angle of relative pivoting between the graspable body and the stress member.

Such activation and deactivation means make it possible automatically to interrupt the power supply to the computation means when the tension meter is not used, thereby enabling power to be saved at said power supply.

According to an advantageous characteristic of the invention, said stress member comprises an arm mounted to pivot relative to the graspable body and said return means comprise two helical springs, e.g. of general shape at least partially cylindrical and/or at least partially conical, and optionally formed in one piece, that extend on either side of the axis of the arm, preferably at or in the vicinity of the free end of said arm.

Implementing the return means in the form of helical springs distributed on either side of the axis of the arm makes it possible to urge the arm reliably back into said neutral position.

According to an advantageous characteristic of the invention, said arm is provided with means for coupling to the slide of the potentiometer, said coupling means being configured in such a manner as to cause the slide to move in the direction of pivoting of the arm while also leaving the slide free to move over a given stroke along the axis of said arm.

In another embodiment of the invention, said measurement means comprise a rotary potentiometer that has a variable resistive element and a rotary control shaft making it possible to cause the resistance of said resistive element to vary, said variable resistive element and the control shaft being coupled one to the stress member and the other to the graspable body.

Advantageously, said control shaft carries gearing, such as a gear wheel, suitable for meshing with a toothed wheel that is secured to or integral with the graspable body. Preferably, said toothed wheel and the graspable body are formed in one piece.

The gearing mechanism between the rotary potentiometer and the graspable body, or the stress member, depending on whether the potentiometer is carried by the stress member or by the graspable body, makes it simple and reliable to use the relative pivoting between the graspable body and the stress member to modify the electrical resistance of the potentiometer. This electrical resistance can then be converted into a value for the tension of the string because said relative pivoting is representative of the deformation of the deformable element, which deformation is itself representative of the tension of the string. More precisely, as explained above, modifying the electrical resistance of the potentiometer as a function of the relative pivoting between the graspable body and the stress member makes it possible to supply to the computation means a magnitude representative of the relative pivoting between the graspable body and the stress member. Said magnitude may be a voltage measured across a terminal corresponding to the ground of the potentiometer and a terminal corresponding to the control shaft of the potentiometer. Said magnitude can be processed by said computation means to determine the corresponding tension of the string. It is possible, in particular, to make provision to filter and/or to amplify the signal corresponding to said magnitude and acquired by the computation means.

Implementing the graspable body in the general shape of a toothed wheel is very advantageous because, since said graspable body is designed to be turned by the operator by hand, said graspable body can mesh directly, via its toothed portion, with the gear wheel carried by the control shaft of the potentiometer without it being necessary to add any additional gearing means.

According to an advantageous characteristic of the invention, said return means include a portion connected to the graspable body at two opposite points about the pivot axis corresponding to the pivotability of the graspable body relative to the stress member, and another portion connected to the stress member at two opposite points about said pivot axis.

Distributing the connection points between said return means, the graspable body and the stress member on either side of the pivot axis offers reliable and balanced deformation of said return means while the graspable body and the stress member are pivoting relative to each other.

Preferably, said return means are in the general shape of a cross, one branch of which is coupled at or in the vicinities of its ends to the graspable body, and the other branch of which is coupled at or in the vicinities of its ends to the stress member.

Thus, the relative pivoting between the graspable body and the stress member results in one branch of the cross flexing relative to the other branch. Such a design for the deformable element makes it possible to simplify mounting said deformable element for manufacturing the tension meter because said cross-shaped deformable element can be mounted in different angular positions due to its planes of symmetry and be sandwiched between the graspable body and the stress member while being centered on the pivot axis of the graspable body.

The connection means for connecting said return means to the graspable body and the connection means for connecting said return means to the stress member are each formed by at least two sets of pins and of pin-receiving orifices, each set being disposed on either side of the pivot axis of the tension meter, when the tension meter is in the assembled state.

According to an advantageous characteristic of the invention, said return means are made of elastomer, and preferably of styrene-ethylene/butylene-styrene (SEBS).

Advantageously, said return means comprise at least one elongate portion and the opposite ends of the elongate portion of the deformable element are connected to two distinct points of the graspable body, preferably to two points that are diametrically opposite about the pivot axis corresponding to the pivotability of the graspable body relative to the stress member.

According to an advantageous characteristic of the invention, said return means comprise at least one elongate portion, and the longitudinal axis of said elongate portion of said deformable element is, in the absence of stress from the graspable body, substantially coplanar with the pivot axis of the graspable body defined by the axis that is contained in the midplane passing through said bearing elements designed to straddle the string and that is perpendicular to the axis of the string passage defined between the two bearing elements.

In other words, said return means are substantially centered on the pivot axis of the graspable body of the tension meter, thereby making it possible for the return means to have deformation behavior that is identical in either direction, and thus for the tension of a string that is deformed in either direction to be determined reliably and quickly.

Such an arrangement of said return means relative to the pivot axis of the graspable body also simplifies the design and manufacturing of the tension meter while also offering accurate and reliable measurement of the tension of the string on the basis of the deformation of the deformable element in either direction, corresponding to the graspable body pivoting in either direction, depending on whether the user is right-handed or left-handed.

Modifying the electrical resistance of the potentiometer as a function of the relative pivoting between the graspable body and the stress member makes it possible to supply to the computation means a magnitude representative of the relative pivoting between the graspable body and the stress member that can be processed by said computation means to determine the corresponding tension of the string.

In another embodiment of the tension meter of the invention, said return means comprise a flexible element, preferably constituted by a flexible blade, and said measurement means comprise at least one strain gauge positioned on said flexible element.

The flexible element flexing causes the resistive wires of the or each gauge to be stretched, thereby modifying their electrical resistance and thus making it possible to deduce therefrom the flexing of the flexible element. The deformation by flexing of the flexible element is a function of the internal or initial tension of the string, i.e. of the tension of the string in the absence of stress thereon. Thus, the measurement of the flexing of the flexible element that results from the pivoting of the graspable body makes it possible to determine the tension of the string.

The relative pivoting between the graspable body and the stress member, in either direction, causes the flexible element to flex, which flexing can be detected in either direction, e.g. with the same strain gauge or with the same set of strain gauges mounted on the blade.

The use of a flexible element for connecting the graspable body to the stress member also makes it possible to improve the accuracy of measurement of the tension of the string, and to facilitate manipulation of the tension meter.

Over time, the flexing behavior of a flexible element is stable and the risk of degradation of the flexing properties of said element is very low. Flexing of the flexible element is also a parameter that is measurable reliably and accurately, both in one flexing direction and in the other direction.

It can also be observed that measuring the tension of a string by exerting torque on the string, and then measuring the deformation of a flexible element associated with the string is accurate and reliable.

The use of at least one strain gauge makes it possible to supply a magnitude representative of the flexing of the flexible element that can be processed by computation means to determine the corresponding tension of the string. More precisely, modifying the electrical resistance of said at least one strain gauge as a function of the relative pivoting between the graspable body and the stress member makes it possible to supply to the computation means a magnitude representative of the relative pivoting between the graspable body and the stress member. Said magnitude may be a voltage measured at said at least one strain gauge. Said magnitude can be processed by said computation means to determine the corresponding tension of the string. It is possible, in particular, to make provision to filter and/or to amplify the signal corresponding to said magnitude and acquired by the computation means.

According to an advantageous characteristic of the invention, the graspable body is an annular body, e.g. it is ellipsoidal in shape.

According to an advantageous characteristic of the invention, the flexible element is an elongate element that extends inside the space defined by said annular graspable body. In the non-stressed state, said flexible element is in the form of a plane blade.

Advantageously, the opposite ends of the flexible element, preferably of the flexible blade, are connected to two distinct points of the annular graspable body, preferably to two diametrically opposite points. Preferably, the stress member is fastened to the flexible element, preferably to the flexible blade, between and spaced apart from the two ends of the flexible element, preferably in the middle zone of the length of said flexible element.

According to an advantageous characteristic of the invention, with the flexible element being an elongate element having a longitudinal axis orthogonal to its flexing axis, the measurement means are situated at least in part between the stress member and the end or one of the ends of the flexible element that is connected to said graspable body, preferably in the middle of the length between the stress member and said end of said flexible element.

According to an advantageous characteristic of the invention, with the flexible element being an elongate element, the longitudinal axis of the flexible blade is substantially coplanar with the pivot axis of the graspable body defined by the axis that is contained in the midplane passing through said bearing elements designed to straddle the string and that is perpendicular to the axis of the string passage defined between the two bearing elements. In other words, the flexible element formed, for example, by a flexible blade or beam is substantially centered on the pivot axis of the graspable body of the tension meter, thereby making it possible for the return means to have deformation behavior that is identical in either direction, and thus for the tension of a string that is deformed in either direction to be determined reliably and quickly.

Such an arrangement of said flexible element relative to the pivot axis of the graspable body also simplifies the design and manufacturing of the tension meter while also offering accurate and reliable measurement of the tension of the string on the basis of the flexing of the flexible element in either direction, corresponding to the graspable body pivoting in either direction, depending on whether the user is right-handed or left-handed.

Advantageously, the tension meter is equipped with detection means for detecting the string, which detection means are configured to transmit a control signal when they are situated in register with said string, which control signal causes said magnitude measured by said measurement means to be stored in a memory.

The invention also provides a method of determining the tension of a racquet string, by means of a tension meter as described above, said method being characterized in that said method comprises the following steps:
  positioning the stress member of the tension meter so that it straddles an individual string via its two bearing elements;
  turning the graspable body of the tension meter until a predefined angular position is obtained for the stress member or for the graspable body relative to the string, in which angular position the two bearing elements of the stress member exert torque on the string;
  measuring the relative pivoting between the graspable body and the stress member; and
  computing the tension of the string on the basis of said measurement.

BRIEF DESCRIPTION OF THE DRAWINGS

The invention can be well understood on reading the following description of embodiments given with reference to the accompanying drawings, in which:

FIG. 3 is a view from below of the FIG. 1 tension meter, for which a portion of the housing is not shown, in the state in which it is straddling a string, in the configuration used for a right-hander, and before said string is deformed;

FIG. 3A is a view from below of the FIG. 3 tension meter, in the state in which it is straddling the string and in the state in which the graspable body is turned until the desired angular positioning of said body relative to the string is obtained;

FIG. 4 is a view from below of the FIG. 1 tension meter, for which a portion of the housing is not shown, in the state in which it is straddling a string, in the configuration used for a left-hander, and before said string is deformed;

FIG. 4A is a view from below of the FIG. 4 tension meter, in the state in which it is straddling the string and in the state in which the graspable body is turned until the desired angular positioning of said body relative to the string is obtained;

DETAILED DESCRIPTION OF THE PREFERRED EMBODIMENTS

Figure 1:
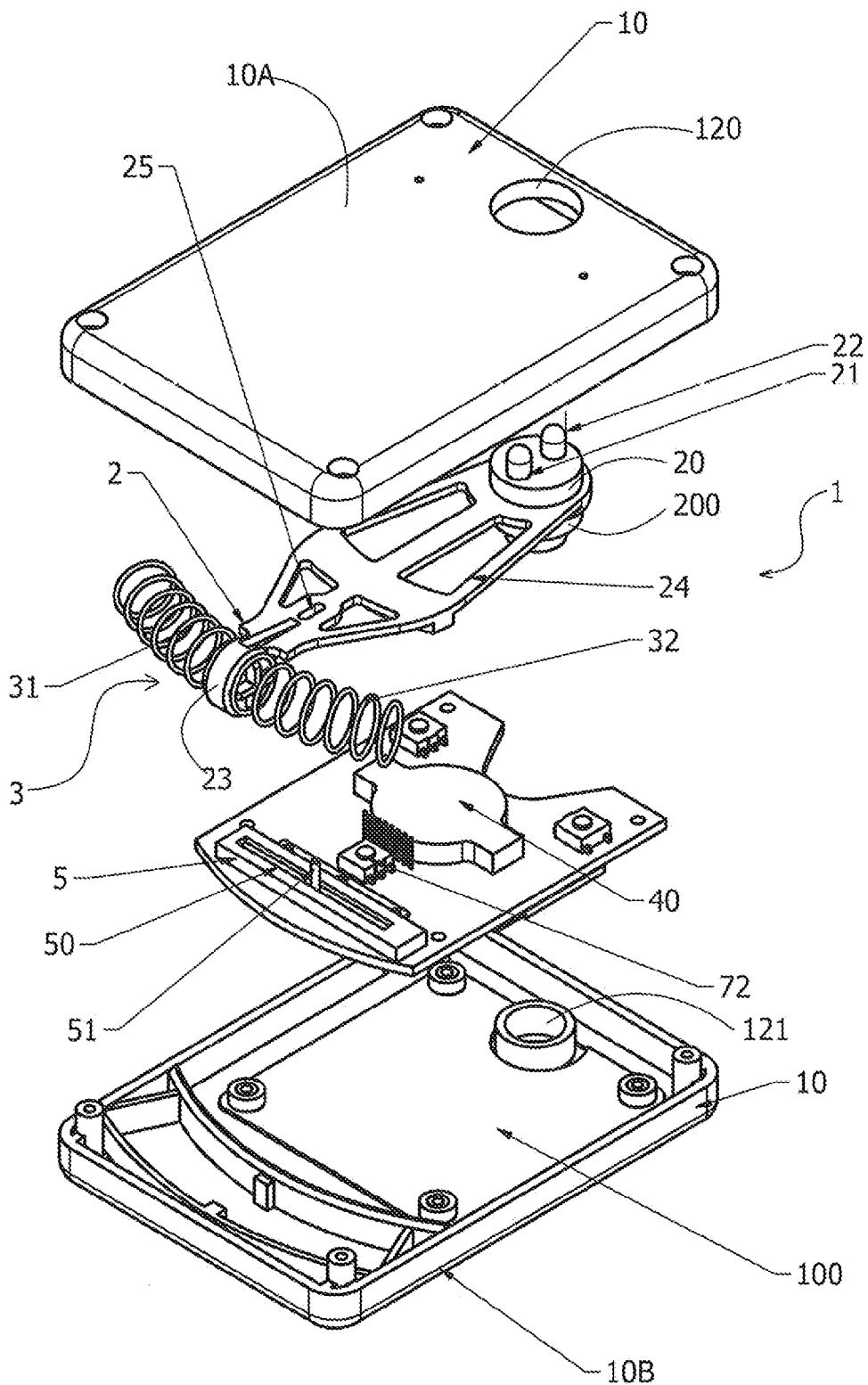
FIG. 1 is an exploded perspective view from below of a first embodiment of the tension meter of the invention.
Figure 2:
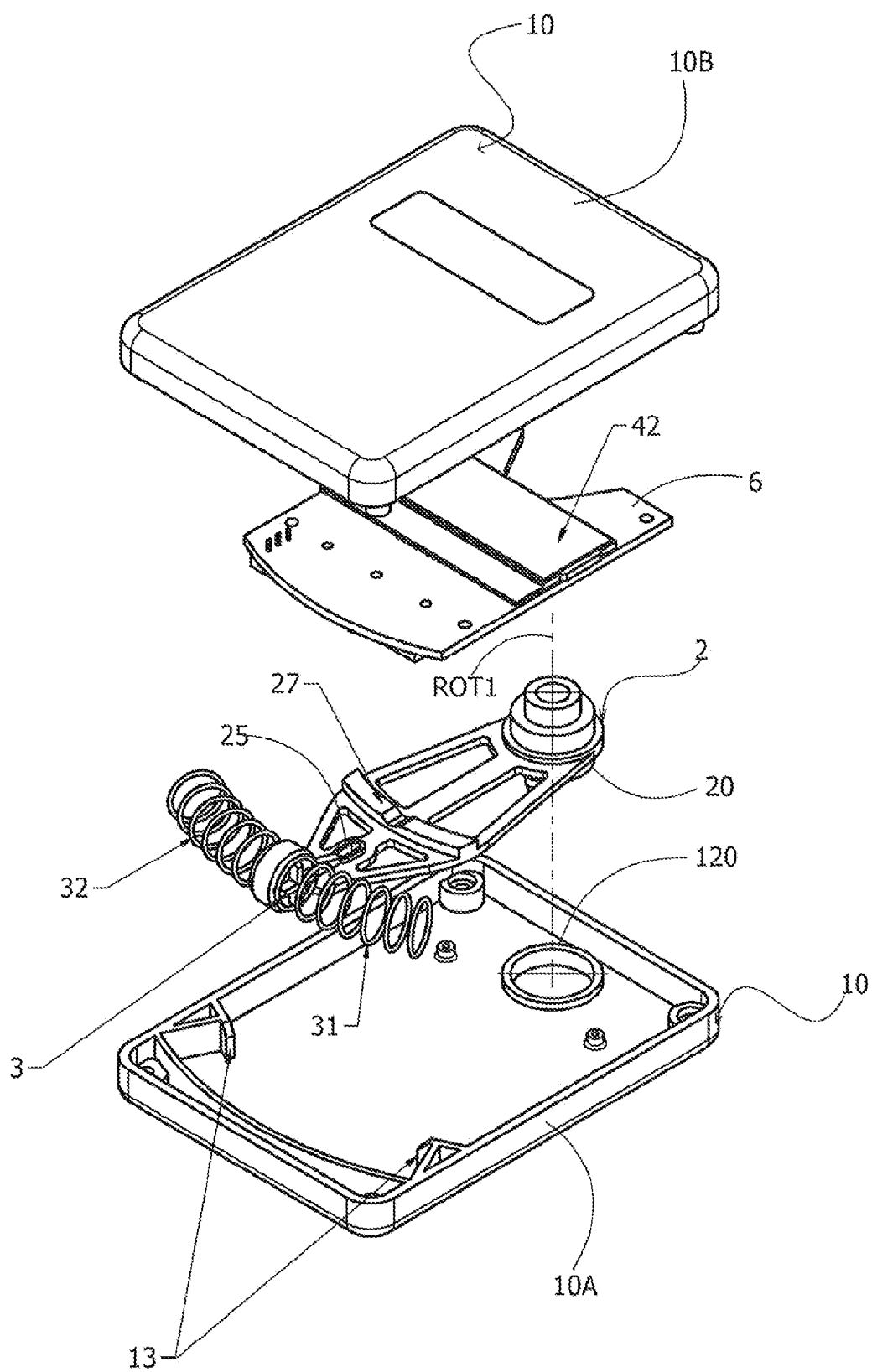
FIG. 2 is an exploded perspective view from above of the FIG. 1 tension meter.
Figure 5:
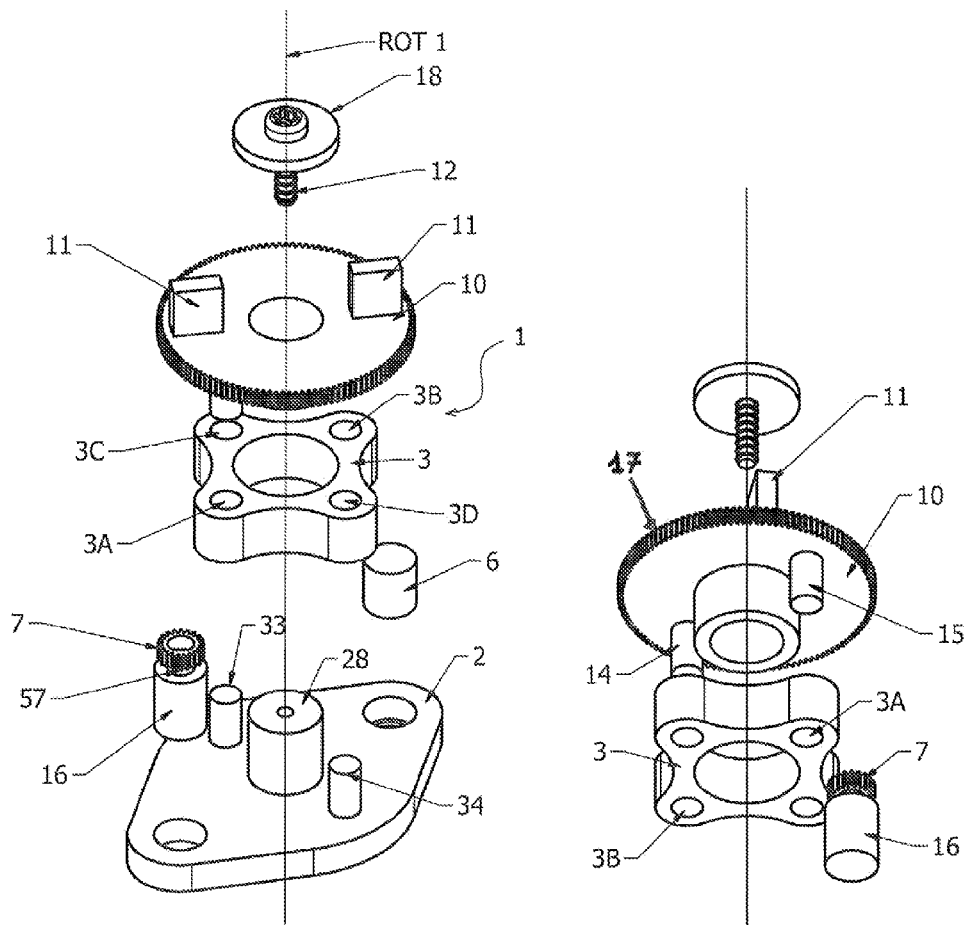
FIG. 5 is an exploded perspective view from above of a second embodiment of a tension meter of the invention.
Figure 5A:
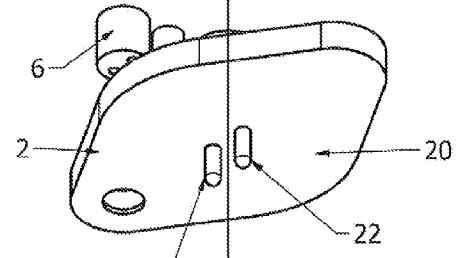
FIG. 5A is an exploded perspective view from below of the FIG. 5 tension meter.
Figure 6B:
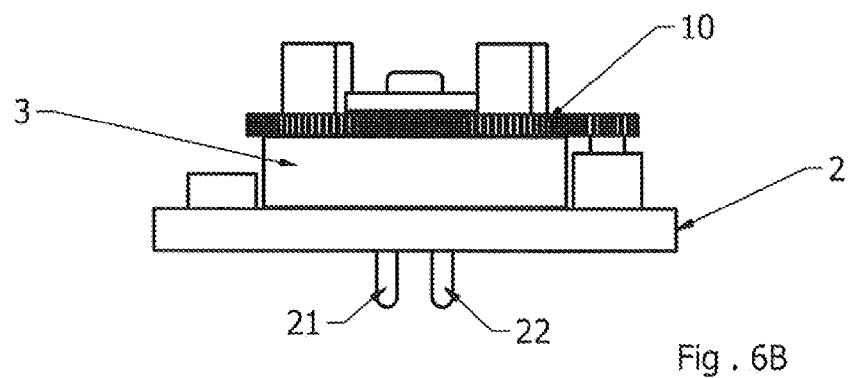
FIG. 6B is a side view of the FIG. 6 tension meter.
Figure 6A:
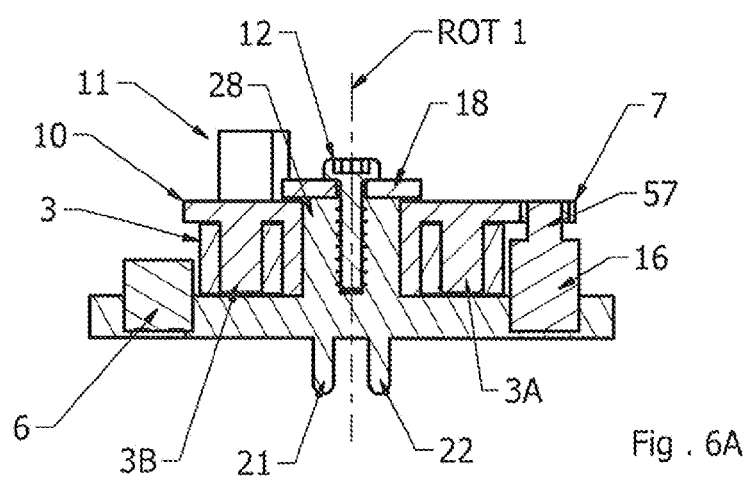
FIG. 6A is an axial section view of the FIG. 6 tension meter on line A-A.
Figure 6:
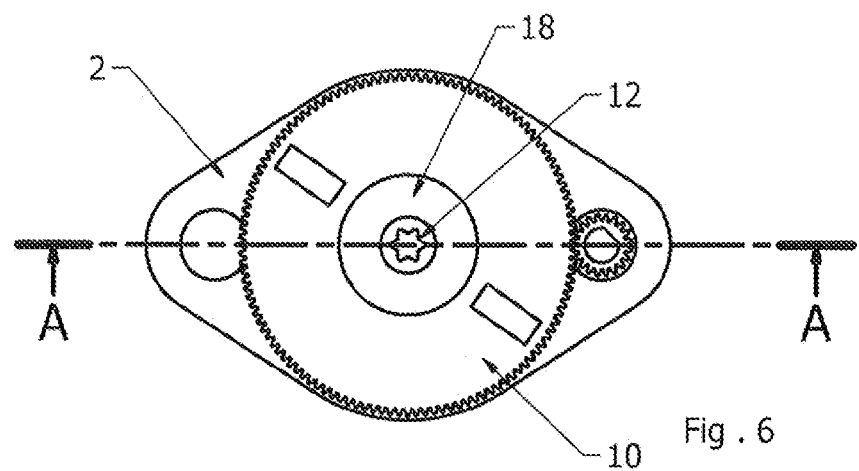
FIG. 6 is an exploded perspective view from above of the FIG. 5 tension meter in the assembled state.
Figure 7:
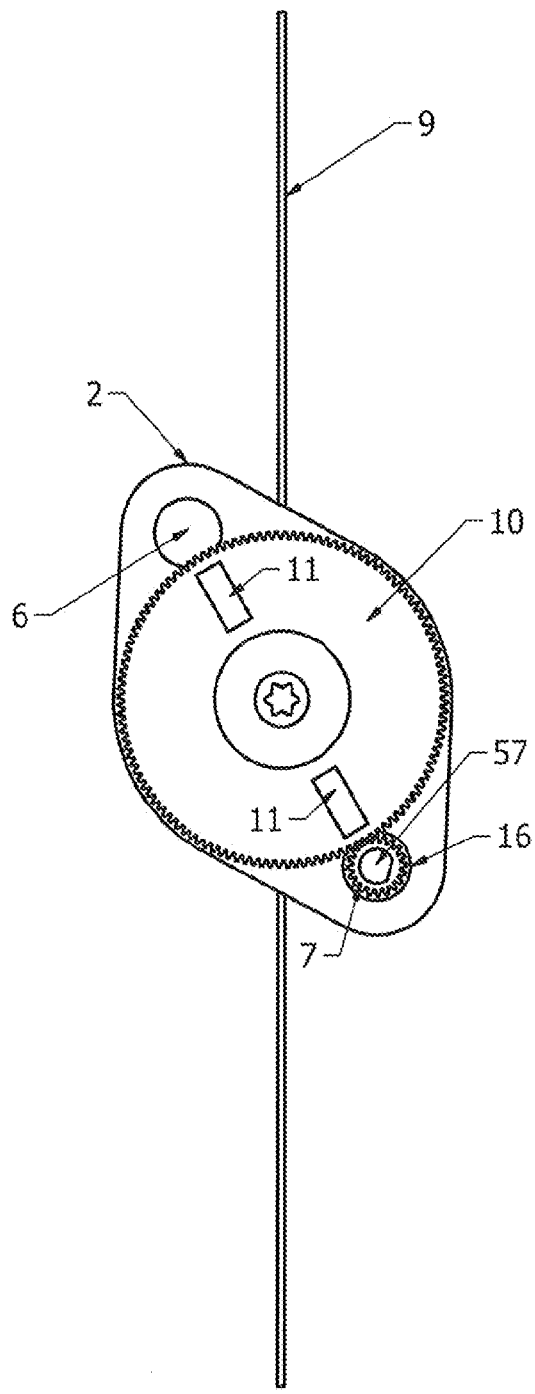
FIG. 7 is a view from above of the FIG. 6 tension meter, in the state in which it is straddling a string, and before said string is deformed, while being positioned with a view to applying a clockwise pivot movement to the graspable body, preferably for a right-hander.
Figure 7A:
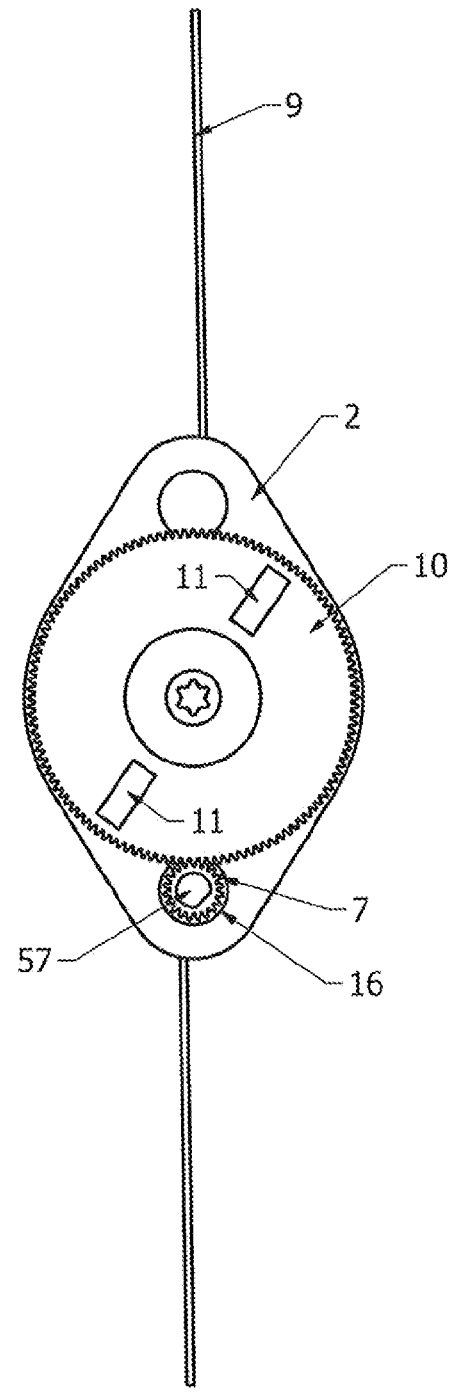
FIG. 7A is a view from above of the FIG. 7 tension meter, in the state in which it is straddling a string in the FIG. 7 configuration, and in the state in which the graspable body is turned clockwise until the string is detected.
Figures 8, 8A:
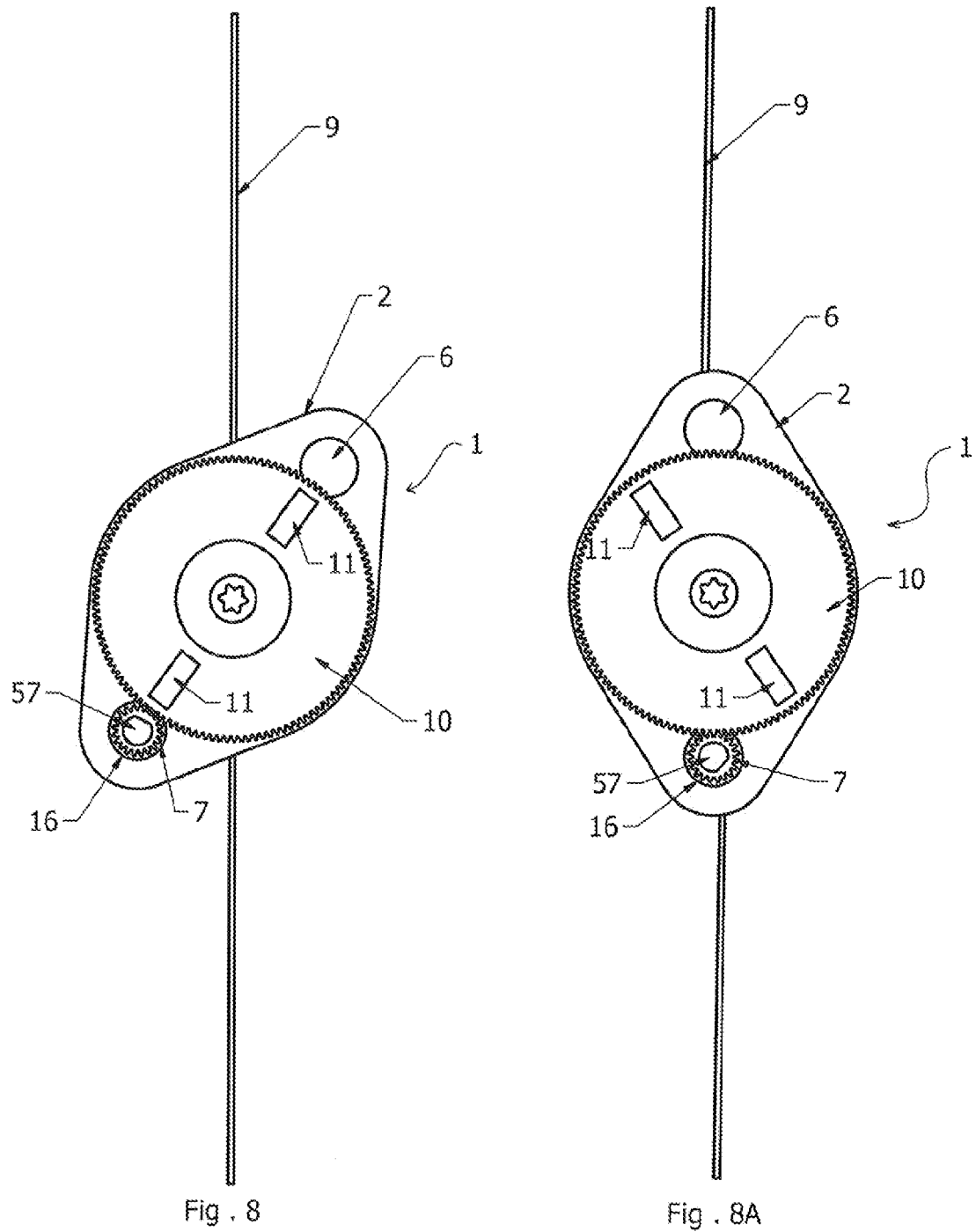
FIG. 8 is a view from above of the FIG. 6 tension meter, in the state in which it is straddling a string, and before said string is deformed, while being positioned with a view to applying a counterclockwise pivot movement to the graspable body, preferably for a left-hander.
FIG. 8A is a view from above of the FIG. 8 tension meter, in the state in which it is straddling a string and in the state in which the graspable body is turned counterclockwise until the string is detected.

In the description below, three embodiments of the tension meter of the description are described. The elements of the tension meter that are to be found in one embodiment to another are designated by like references for simplification reasons.

With reference to the figures, and as indicated above, the invention relates to an individual tension meter 1 for measuring tension in a racquet string 9. At or in the vicinities of its ends, the string in which tension is to be measured is anchored in the racquet frame (not shown).

Said tension meter includes a body, referred to as the "graspable body" 10, suitable for being taken hold of in the hand. Said tension meter also includes a stress member 2 for stressing the string 9 by elastically deforming said string. Said stress member 2 includes at least two bearing elements 21, 22 spaced apart from each other, such as studs or fingers, positionable on either side of an individual string 9. The two bearing elements 21, 22 are referred to as "prongs". Said prongs are carried by a plate 20 of the stress member.

Said graspable body 10 and said stress member 2 are movable relative to each other in a pivotal relative movement. Said pivoting movement corresponds substantially to pivoting about the pivot axis ROT1 orthogonal to the string and in the midplane passing between said prongs astride the string.

Said tension meter also includes elastically deformable return means 3 connected to the graspable body 10 and to the stress member 2 for stressing the string. Said return means 3 are configured to urge the graspable body 10 and the stress member 2 relative to each other back into a given angular position referred to as the "neutral position". Said neutral position corresponds to a configuration in which said graspable body 10 and said stress member 2 are not stressed by the user, i.e. are not stressed relative to each other by any pivoting force exerted by the user.

Said elastically deformable return means 3 may be fastened to the graspable body 10 and to the stress member 2 or else be merely interposed between the graspable body 10 and the stress member 2.

Said tension meter also includes measurement means for measuring a physical magnitude representative of the relative pivoting between the graspable body 10 and the stress member 2, and computation means for computing the tension of the string as a function of said measured magnitude. Said measurement means and the corresponding measured magnitude are described in detail below.

In particular, the tension meter includes an electronic and computer system, such as a microprocessor, that includes said computation means and that is connected to said measurement means so as to make it possible for the magnitude measured by said measurement means to be acquired and for said tension of the string to be computed by said computation means as a function of said measured magnitude.

Said computation means may be in the form of computer instructions implemented in said electronic and computer system.

In a manner characteristic of the invention, the graspable body 10 and the stress member 2 have two possibilities of pivoting relative to said return neutral position of the graspable body and of the stress member. Relative to each other, the graspable body 10 and the stress member 2 have a first possibility of pivoting in a first direction, adapted to a right-hander, and a second possibility of pivoting in a second direction, adapted to a left-hander, opposite from the first direction. Thus, said tension meter can be used both by a left-hander and by a right-hander.

In other words, the graspable body 10 and the stress member 2 are suitable for pivoting relative to each other, in either direction relative to said neutral position.

In the example shown in particular in FIGS. 1 to 4, for which said return means are formed by helical springs, and in FIGS. 5 to 8, for which said return means are formed by a cross-shaped deformable body, the tension meter includes a physical pivotal connection between said graspable body and said stress member.

Figure 9B:
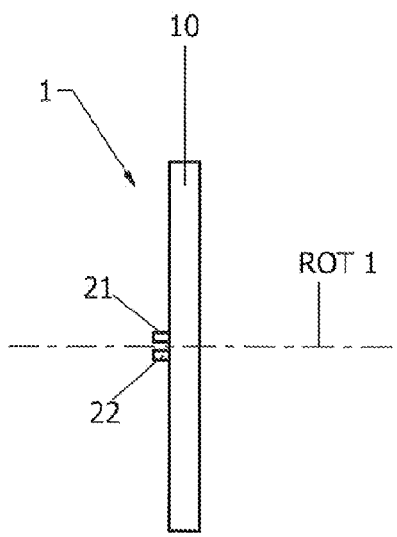
FIG. 9B is a side view of the FIG. 9 tension meter.
Figure 9A:
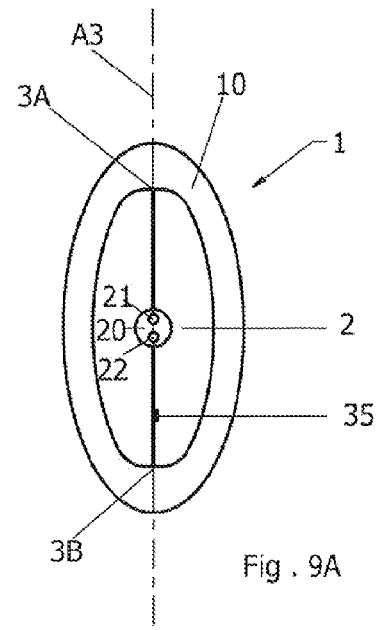
FIG. 9A is a view from below of the FIG. 9 tension meter.
Figure 9:
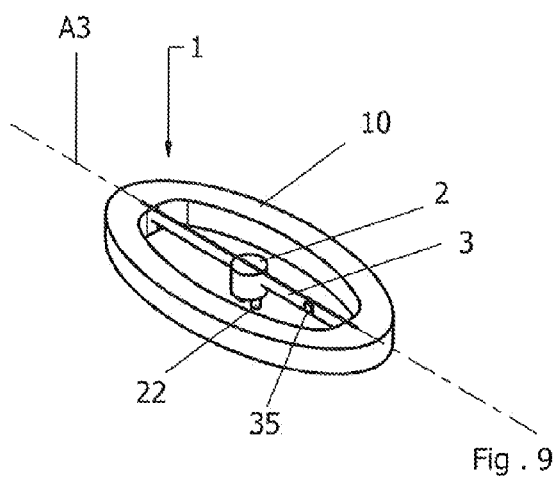
FIG. 9 is an exploded perspective view of a third embodiment of a tension meter of the invention.
Figure 10A:
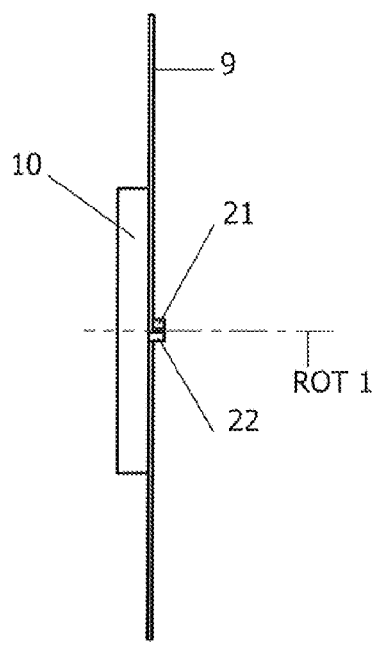
FIG. 10A is a view from above of the FIG. 10 tension meter in the state in which it is straddling the string, before said string is deformed.
Figure 10:
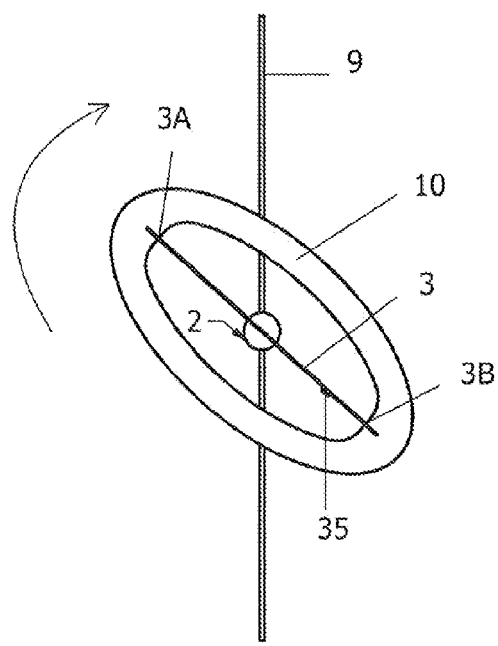
FIG. 10 is a view from above of the FIG. 9 tension meter in the state in which it is straddling a string, before said string is deformed.
Figure 11A:
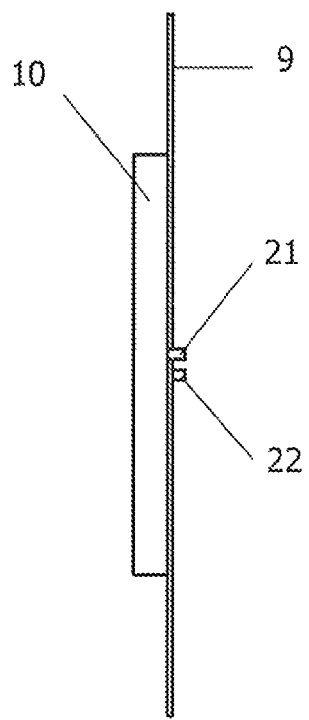
FIG. 11A is a side view of the FIG. 11 tension meter in engagement with the string.
Figure 11:
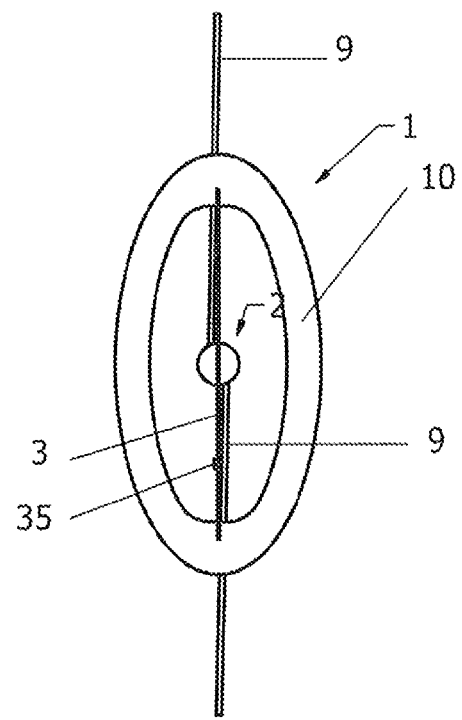
FIG. 11 is a view from above of the FIG. 9 tension meter, in the state in which it is straddling a string and in the state in which the graspable body is turned until the desired angular positioning of said body relative to the string is obtained.

In the example shown in FIGS. 9 to 11, for which said return means are formed by a flexible blade, the pivotability of the graspable body relative to the stress member is formed in the state in which the prongs of the stress member are positioned on either side of the string and are bearing against the string. In which case, it is possible to make provision for there to be no physical pivot connection between the stress member and the graspable body, but for the graspable body to be suitable for pivoting relative to the stress member in engagement with the string, about said pivot axis transverse to the string and parallel to the midplane passing through said prongs astride the string.

As indicated above, said neutral angular position corresponds to a configuration in which said graspable body 10 and the stress member 2 are not stressed relative to each other, since no pivoting force external to the tension meter is exerted on the stress member or on the graspable body. In other words, said neutral position corresponds to a configuration in which the graspable body and the stress member are in equilibrium relative to each other.

Said computation means are configured to compute the tension of the string as a function of said magnitude measured by said measurement means following the pivoting in either direction between the graspable body 10 and the stress member 2 relative to the neutral position of the graspable body 10 and of the stress member 2.

In the example shown in FIGS. 1 to 4, said measurement means include a linear potentiometer 5. Said measurement means are also formed by the electronic and computer system that is configured to acquire a magnitude or signal, such as a voltage measured at the potentiometer, the value of which voltage depends on the resistance of the potentiometer 5. Said measured magnitude corresponds to the resistance of said linear potentiometer that varies as a function of the position of the slide 51 along said linear resistive element 50, said position of the slide 51 being, itself, a function of the relative pivoting between the graspable body 10 and the stress member 2. Said potentiometer 5 is connected to the electronic and computer system that acquires said magnitude or signal, the value of which depends on the value of the resistance of the potentiometer. Said computation means, which are part of said electronic and computer system, compute the tension of the string corresponding to the measured magnitude or to the measured signal, the value of which depends on the resistance of the linear potentiometer. In other words, the combination of said linear potentiometer and of the electronic and computer system that includes said computation means makes it possible to measure the relative pivoting between the graspable body and the stress member and thus to measure the tension of the string.

In the example shown in FIGS. 5 to 8, said measurement means include a rotary potentiometer 16. Said measurement means are also formed by the electronic and computer system that is configured to acquire a magnitude or signal, such as a voltage measured at the potentiometer, the value of which voltage depends on the resistance of the potentiometer 16. Said measured magnitude corresponds to the resistance of said rotary potentiometer that varies as a function of the angular position of the control shaft 57, said angular position of the control shaft being, itself, a function of the relative pivoting between the graspable body and the stress member. Said rotary potentiometer 5 is connected to the electronic and computer system that acquires said magnitude associated with the potentiometer. Said computation means, which are part of said electronic and computer system, compute the tension of the string corresponding to the value of said measured magnitude, which value depends on the resistance of the rotary potentiometer. In other words, the combination of said rotary potentiometer and of the electronic and computer system that includes said computation means makes it possible to measure the relative pivoting between the graspable body and the stress member and thus the tension of the string.

In the example shown in FIGS. 9 to 11, said measurement means include at least one strain gauge 35. Said measurement means are also formed by the electronic and computer system that is configured to acquire a magnitude or signal, such as a voltage measured at said at least one strain gauge, the value of which voltage depends on the resistance of said at least one strain gauge 35. Said measured magnitude depends on the resistance of the resistive wires that make up the strain gauge, said resistance varying as a function of the stretch of said gauge, which stretch is, itself, a function of the flexing of the blade and thus of the relative pivoting between the graspable body and the stress member. Said or each strain gauge is connected to the electronic and computer system that acquires said magnitude that depends on said value of the resistance of the or each strain gauge. Said computation means, which are part of said electronic and computer system, compute the tension of the string corresponding to the measured magnitude, the value of which depends on the resistance of the or each strain gauge. In other words, the combination of the or each strain gauge and of the electronic and computer system that includes said computation means makes it possible to measure the relative pivoting between the graspable body and the stress member and thus the tension of the string.

Said elastically deformable return means 3 are, in the state in which the two bearing elements of said stress member are astride the string, deformable by said graspable body pivoting about an axis transverse to the string and in the midplane passing through said bearing elements astride the string.

As described in detail below, in each of the embodiments of the invention, the graspable body 10, the stress member 2, the return means 3 and said measurement means are configured to enable the graspable body 10 and the stress member 2 to pivot relative to each other, in either direction relative to said neutral position.

Said measurement means are suitable for measuring a magnitude representative of the relative pivoting between the graspable body 10 and the stress member 2 in either direction relative to said neutral position.

In the example shown in FIGS. 1 to 4, for which said measurement means include a linear potentiometer 5, and when the graspable body 10 and the stress member 2 are in the neutral position, the slide 51 of the linear potentiometer is situated substantially half way between the end-of-stroke ends of the linear resistive element. In similar manner, in the example shown in FIGS. 5 to 8, for which said measurement means include a rotary potentiometer, and when the graspable body 10 and the stress member 2 are in the neutral position, the control shaft 57 of the rotary tension meter is situated substantially in the middle of the angular sector defined between the end angular positions that said control shaft of the potentiometer can take up in either direction of pivoting relative to said return neutral position.

Similarly, in the example shown in FIGS. 9 to 11, for which said measurement means include at least one strain gauge, and when the graspable body 10 and the stress member 2 are in the neutral position, the or each strain gauge is not subjected to any deformation stress. The or each strain gauge can follow the flexing of the flexible element in either direction so as to deform in one direction of flexing of the flexible element and in the other direction so as to follow the flexing of said flexible element.

Said return means 3 have a first possibility of deforming in a direction corresponding to said first direction of pivoting of the graspable body 10 relative to the stress member 2 and a second possibility of deforming in a direction corresponding to said second direction of pivoting of the graspable body 10 relative to the stress member 2.

In other words, said return means 3 are suitable for being deformed in either direction relative to said neutral position of the graspable body 10 and of the stress member 2. As indicated above, the deformation of the return means is representative of the relative pivoting between the graspable body and the stress member.

Relative to each other, and on either side of the neutral position, the graspable body 10 and the stress member 2 have a stroke or range of angular movement of not less than 10°.

Said return means 3 are suitable for deforming over said stroke and the measurement means are also suitable for measuring the string tension corresponding to a deformation of said return means 3 over such a stroke.

In the state in which the two prongs 21, 22 of said stress member 2 are positioned on either side of the string, said return means 3 and the stress member 2 are arranged in such a manner that the midplane passing through said prongs 21, 22 astride the string forms, in the neutral position, a plane of symmetry for said return means 3, as in the two embodiments shown in FIGS. 1 to 8 and/or a plane in which said return means 3 extend, as in the embodiment shown in FIGS. 9 to 11, for which said return means are formed by a flexible blade.

The term "arranged" means that said return means 3 and the stress member 2 are disposed, dimensioned, and/or angularly positioned so that the midplane passing through said prongs 21, 22 astride the string forms, in the neutral position, a plane of symmetry for said return means 3 and/or a plane in which said return means 3 extend.

When the graspable body 10 pivots relative to the stress member 2, in one direction, through a given angle relative to the neutral position, said return means have, in absolute terms, a deformation stroke that is substantially identical to the deformation stroke that they have when the graspable body 10 pivots relative to the stress member 2 through said given angle relative to the neutral position in the other direction. Thus, in either direction of pivoting applied to the graspable body 10, the computation means can determine the tension of the string, on the basis of said magnitude measured by said measurement means, with computation functions that are substantially similar, optionally ignoring sign.

As indicated above, the computation means, such as a microprocessor, make it possible to convert the measured magnitude that depends on the value of the electrical resistance of resistive system used, e.g. a linear potentiometer, a rotary potentiometer, or at least one strain gauge, depending on the embodiment implemented, into a value for the string tension. To this end, it is possible to make provision for the computation means to comprise one or more computation formulae and/or one or more correspondence curves or correspondence tables between the measured magnitude values and the string tension values. The term "tension" is used to mean the initial tension or the rest tension of the string, i.e. the tension when the string is in the state in which it is not stressed by the stress member. Advantageously, said computation means take into account a measured magnitude value only beyond a certain threshold value in order to offer a string tension measurement that is sufficiently reliable.

On the basis of said received magnitude value and using one or more computation functions, correspondence tables, or nomographs stored in said computation means, the computation means determine the corresponding tension of the string, thereby making it possible to indicate directly to the user the determined string tension, e.g. by displaying the determined value on a screen equipping the tension meter.

The tension meter is also equipped with detection means 6 for detecting the string of which the tension is to be measured. Said detection means 6 are configured to transmit a signal when they are situated in register with said string, preferably a control signal for causing the value of the electrical resistance of the potentiometer 5 to be stored in a memory.

In the example shown in the figures, said detection means 6 are formed by a device comprising two detection cells, e.g. optical cells. Said detection means 6 are configured to cause the computation means to cause the value of the electrical resistance of the potentiometer to be stored in a memory when the beams of the cells are interrupted by the string, i.e. when the detection means 6 are situated in register with the string.

It is then possible to make provision for the cells and for the computation means to be configured in such a manner that, when the cells of the detection means detect the presence of the string, said detection means 6 transmit a signal for the computation means so that said computation means store in a memory the value of the electrical resistance corresponding to the relative pivoting between the graspable body and the stress member at the instant at which the string is detected. The computation means can then, on the basis of said stored value, compute in accurate and reliable manner the corresponding string tension value, without the operator needing to hold the graspable body in equilibrium in this configuration in which the string is stressed. The operator does not need to worry about the accuracy of the pivoting applied to the graspable body. During the pivoting of the graspable body and at the instant at which the detection means 6 pass over the string, they detect its presence and send a signal to the computation means, which, at that instant, store in a memory, the value of the magnitude, such as a voltage, associated with the element or with the resistive system used, e.g. a potentiometer or at least one strain gauge, so as to convert it into a string tension value, independently of the subsequent movement of the tension meter.

Each detection cell may be an optical cell or a sound wave cell such as an ultrasound wave cell.

In a variant, provision may be made for said signal transmitted by the detection means 6 to be an optical or visible signal indicating to the operator to cease turning the graspable body so as to read the string tension value computed by the computation means.

The method of measuring the tension in a string using such a tension meter comprises the following steps:
 positioning the stress member 2 of the tension meter so that it straddles an individual string 9 via its two bearing elements 21, 22;
 turning the graspable body 10 of the tension meter until a predefined angular position is obtained for the graspable body 10 relative to the string 9, in which angular position the two bearing elements 21, 22 of the stress member exert torque on the string 9;
 measuring the relative pivoting between the graspable body and the stress member;
 computing the tension of the string on the basis of said measurement.

Said graspable body 10, or said stress member 2 (via said graspable body and via the return means), is designed to be turned about said pivot axis ROT1 until the stress member 2 or said graspable body 10 has a predefined given angular position relative to the string, referred to as a "stress angular position", for which the string is stressed by deformation. Thus, in order to measure the tension of the racquet string, the relative pivoting between the graspable body 10 and the stress member 2 is measured once the graspable body 10, or the stress member 2, has the desired angular position relative to the string 9. In a variant, it is possible to make provision to turn the graspable body 10 through a given angle relative to its neutral position.

Said stress angular position may correspond to the straight line passing through two distinct points of the stress member 2 or of the graspable body 10 being superposed on the straight line passing through the string 9. Said points of the stress member 2 serving as references, for alignment with the string 9, may be chosen to be two opposite zones of the graspable body 10, e.g. on the longitudinal axis of said longitudinal graspable body 10, or of the stress member 2. Said stress angular position may also correspond to a given angle of pivoting of the graspable body 10 or of the stress member 2 relative to a configuration in which the bearing elements 21, 22 are bearing against the string 9.

When the tension meter is equipped with detection means for detecting the string 6, said stress angular position corresponds merely to the angular position of the graspable body 10 or of the stress member 2 in which the detection means 6 detect the string, i.e. are situated in register with the string.

For a right-hander, the tension meter is positioned straddling via its prongs 21, 22 in such a manner that the graspable body 10 can be turned clockwise until the desired angular position is obtained for the stress member 2 relative to the string, in particular until a positioning is obtained for the string detection means 6 in which said detection means 6 are in register with the string.

Similarly, for a left-hander, it suffices to position the stress member with its prongs 21, 22 astride the string for the graspable body 10 to be turned counterclockwise.

During the pivoting of the graspable body 10, the two bearing elements 21, 22 exert torque on the string 9 that deforms the string to an extent varying as a function of its initial tension, i.e. its tension in the absence of stress.

The tauter the string, the greater the extent of relative pivoting between the graspable body 10 and the stress member 2 in order to bring the stress member 2 or the graspable body 10 into the desired angular position relative to the string, whereas the slacker the string the greater the extent to which the stress member 2 and the return means 3 naturally follow the pivoting movement of the graspable body 10, and the smaller the extent to which the graspable body 10 and the stress member 2 pivot relative to each other.

The pivot axis ROT1 is orthogonal to the plane of the strings, thereby making it easy to apply torque via the stress member 2 to a string 9 inside the racquet frame with a large degree of freedom, and facilitating manipulating the tension meter.

By choosing to make provision for the pivot axis ROT1 of the graspable body to be orthogonal to the plane of the strings, for the purpose of deforming the string, it is possible to design the stress member 2 in the form of two prongs 21, 22 that are cylindrical in general shape, and that are spaced apart from each other and interconnected via a support or plate 20, and that merely need to be positioned directly astride a string 9. The prongs 21, 22 extend projecting from the plate 20 while being spaced apart from each other in a direction orthogonal to their projection direction in such a manner as to be placed astride a string. When the stress member is positioned astride the string, the plate 20 that interconnects the two prongs extends on one side of the racquet frame, thereby facilitating positioning of the two prongs 21, 22 on either side of the string 9, and thus facilitating manipulation of the tension meter. In particular, the user can easily turn the graspable body about the desired axis without being hindered by the strings.

The two bearing elements 21, 22 of the stress member 2 extend substantially parallel to each other and orthogonally to the mean plane of said graspable body 10 or indeed to the mean plane of the plate 20.

The embodiment of the tension meter shown in FIGS. 1 to 4 is described in detail below. In this embodiment, and as indicated above, said measurement means include a linear potentiometer 5 having a variable resistive element 50 and an adjustment member 51 for adjusting said resistive element, which member is referred to as a "slide" or as a "wiper", and being movable along at least a portion of said variable linear resistive element 50. Said variable linear resistive element 50 and said slide 51 are coupled one to the graspable body 10 and the other to the stress member 2. The electrical resistance of the potentiometer corresponds to the position of the slide along the variable resistive element.

Said tension meter includes activation and deactivation means 27, 72 suitable for activating and deactivating said computation means as a function of the angle of relative pivoting between the graspable body 10 and the stress member 2.

Said activation and deactivation means 27, 72 are configured to deactivate the computation means, in particular the power supply 40 of the computation means, in the configuration in which the graspable body is not stressed relative to the stress member, and vice versa. Said activation and deactivation means are configured to activate the computation means, and in particular the power supply of the computation means when the graspable body 10 pivots relative to the stress body 2, and vice versa, in either direction, and beyond a given stroke.

In the example shown in FIGS. 1 to 4, said activation and deactivation means are formed by a push button 72 connected to the power supply of the computation means. In its "out" position, the push button 72 deactivates the power supply, and, conversely, in its "in" position, it activates the power supply means. Said push button 72 is urged to return to its "out" position. Said activation and deactivation means are also formed by a portion of the stress member 2 that comes to push in the push button 72 when the graspable body 10 and the stress member 2 pivot relative to each other to an extent greater than a given value, and allows the button to return to its "out" position when they pivot relative to each other to a lesser extent.

Said stress member 2 comprises an arm 24 mounted to pivot relative to the graspable body and said return means 3 comprise two helical springs 31, 32, optionally formed in one piece, that extend on either side of the axis of the arm 24, preferably at or in the vicinity of the free end 23 of said arm 24.

Said springs that form said return means are preferably compression springs.

Said arm 24 is mounted to pivot relative to the graspable body at or in the vicinity of its end 200 opposite from said free end 23 in contact with the return means 3. Said end 200 has a male portion co-operating with a corresponding female portion 121 of the graspable body to form a pivot connection. In a variant, the male portion may be provided on the graspable body and the female portion may be provided on the stress member.

Said return means 3 extend on either side of the longitudinal axis of the arm 24 so as to enable said return means to exert a return force on the arm 24 in the neutral position regardless of the direction in which the graspable body 10 is pivoted relative to the stress member 2.

In particular, one of the springs has an end suitable for coming into bearing abutment on one side of the free end 23 of the arm 24, the other spring having an end suitable for coming into bearing abutment on the other side of the free end 23 of the arm 24 relative to the longitudinal axis of said arm. The other end of each spring is brought to bear against or is connected to a respective portion of the graspable body 10. On either side designed to receive an end of a spring, the free end 23 of the arm 24 has centering means for centering said spring so as to enable the spring to be held properly and guided properly while the arm 24 and the graspable body 10 are pivoting relative to each other.

Said return means 3 are disposed in a recess 30 that has at least one guide wall, and preferably two opposite guide walls, making it possible to guide the deformation of the return means while the graspable body 10 is pivoting relative to the stress member 2, in either direction.

Said or each guide wall extends over a circular arc of center corresponding to the pivot connection between the graspable body 10 and the stress member 2.

Said or each guide wall thus makes it possible to guide the deformation of the return means while they are being deformed in compression and/or in traction when they are stressed by the pivoting of the graspable body 10 which is pivoted relative to the stress member 2 in either direction.

Said tension meter also includes abutment means 36 forming an abutment for each spring 31, 32 or each spring portion that is suitable for coming into bearing abutment on one side of the free end 23 of the arm 24. Said abutment means 36 make it possible to retain one of the springs or one of the spring portions when the other spring or the other spring portion is compressed by the arm 24, thereby making it possible to obtain a reliable measurement of the magnitude representative of the relative pivoting between the graspable body and the stress member.

Advantageously, as shown in FIGS. 3 and 4, said abutment means 36 comprise a lug provided on one or each of the guide walls for guiding the deformation of the spring(s). Said or each lug is centered on the stroke of movement of the arm, so that, when the arm 24 is in the equilibrium position, the or each lug is situated substantially in alignment with the arm 24 without hindering its pivoting movement in either direction. Advantageously, said abutment means 36, the spring(s) 31, 32, and the arm 24 are arranged in such a manner as to limit, or indeed to reduce to zero, the clearance between the spring(s) and the end 23 of the arm 24.

Said abutment means 36 make it possible to pre-stress the springs or spring portions situated on either side of the end 23 of the arm 24, when the arm 24 is in the neutral position, thereby making it possible, while the graspable body 10 is pivoting, to measure a magnitude corresponding to the relative pivoting between the graspable body 10 and the stress member 2, in accurate and reliable manner as of the first degree of relative pivoting. Each spring 31, 32 or spring portion may be pre-stressed by the abutment means 36 by a value corresponding to a given string tension, e.g. a tension of about 10 kilograms (kg), since the measured string tension values are generally greater than 10 kg.

The deformation of a spring or of a portion of the spring corresponds to torque applied to the string due to the graspable body pivoting. By means of each spring 31, 32 or of each spring portion being positioned facing the free end 23 of the arm 24, the operator can use the length of the arm to compress said spring 31, 32 or said spring portion, thereby enabling the operator to apply high torque to the spring and thus to measure easily and reliably high string tension values.

In the example shown in FIGS. 1 to 4, the linear resistive element 50 is secured to the graspable body 10. Said arm has coupling means 25 for coupling to the slide 51 of the potentiometer. Said coupling means are configured in such a manner as to cause the slide 51 to move in the direction of pivoting of the arm, i.e. in a direction transverse to the arm, while leaving the slide 51 free to move over a given stroke along the axis of said arm.

When the graspable body 10 is in the configuration in which it is not stressed relative to the stress member 2, and vice versa, i.e. in the neutral position, the slide 51 is situated substantially in the center of the stroke of possible movement of said slide along the linear resistive element 50.

Similarly, the arm 24 that forms the stress member is in a neutral position when it is substantially at the center of the angular sector through which it can travel relative to the graspable body.

In particular, in the example shown in FIGS. 1 to 4, in the neutral position, the axis of the arm 24 is substantially parallel to the longitudinal axis of the graspable body 10 that is rectangular in general shape. Said graspable body 10 is in the form of a housing made up of two half-shells designed to be fastened together, preferably by screws, and inside which housing the arm 24 is designed to be housed. Said housing also houses the other elements of the tension meter such as the return means 3, the measurement means and the computation means.

One of the half-shells of the housing has a through opening 120 in order to enable the two bearing elements 21, 22 of the arm 2 to extend projecting from the housing.

Said coupling means 25 are formed by an orifice, e.g. an oblong and preferably through hole, provided in the arm and inside which the slide 51 of the potentiometer 5 is received. Said orifice 25 is configured, i.e. dimensioned, relative to the slide 51, in such a manner firstly as to cause the slide 51 to move in a direction transverse to the arm, while the graspable body 10 and the stress member 2 are pivoting relative to each other and secondly as to enable said slide 51 to move over a given distance along the longitudinal axis of the arm 2 so as to enable the slide 51 to follow the rectilinear stroke path defined by the linear resistive element 50.

The dimension of the orifice 25 in the direction orthogonal to the axis of the arm is chosen in such a manner as to obtain clearance that is small, or indeed substantially zero, with said slide, so as to enable the slide 51 to be driven without delay along the linear resistance while the graspable body 10 is pivoting relative to the stress member 2.

Said housing is provided with a display screen 42 connected to the computation means that are received inside the housing. Said screen is situated on the half-shell opposite from the half-shell through which the two bearing elements 21, 22 of the arm 24 project.

Said screen makes it possible to display information such as the state of tension of a string.

The linear resistive element is received in a rectangular block shaped body provided with a slot for enabling the slide to pass through and for defining the movement stroke of said slide along the linear resistive element and through the slot.

The graspable body 10, and in particular one (10A) of the half-shells 10A, 10B, is provided with two end-of-stroke abutments 13 for the stroke through which the graspable body 10 pivots relative to the stress member 2, in either direction.

Said abutments are positioned relative to the linear resistive element in such a manner that, at the end of the pivoting stroke through which the graspable body 10 pivots relative to the stress member 2, the slide 51 remains spaced apart from the ends of the linear resistive element in such a manner as not to damage the linear potentiometer 5.

The embodiment of the tension meter shown in FIGS. 5 to 8 is described in detail below. In this embodiment, and as indicated above, said measurement means comprise a rotary potentiometer 16.

In the example shown in FIGS. 5 to 8, said stress member 2 forms a support for the return means 3 and for the graspable body 10 and, as described in detail below, for the potentiometer 16 and for the detection means 6 for detecting the string.

As described in detail below, said return means 3 are formed by an elastically deformable element 3.

Said elastically deformable element 3 is, in the state in which the two bearing elements 21, 22 are astride the string 9, deformable by said graspable body 10 pivoting about an axis ROT1 transverse to the string and in the midplane passing through said bearing elements 21, 22 astride the string 9. In other words, said deformable element is deformable by the graspable body pivoting relative to the stress member, in either direction, about the pivot axis ROT1.

Said tension meter 1 includes actuation means 7, 17 for actuating the potentiometer 16. Said actuation means make it possible to modify the electrical resistance of the potentiometer 16 as a function of the relative pivoting between the graspable body and the stress member.

Said potentiometer 16 and at least a portion 17 of said actuation means 7, 17 are secured one to the stress member 2 and the other to the graspable body 10.

Said potentiometer 16, which is also referred to as a "variable resistive element", is a rotary potentiometer. A rotary potentiometer is generally made up of one or more resistive elements, the electrical resistance of which can be modified gradually, without it being necessary to open the circuit, by turning a control shaft connected to a wiper or slide in contact with the resistive element(s).

In the example shown in FIGS. 5 to 8, said potentiometer 16 is secured to the stress member 2. The control shaft 57 of said potentiometer 16 carries gearing 7, such as a gear wheel, suitable for meshing with a toothed wheel 17 secured to or integral with the graspable body 10 and forming said at least a portion of said actuation means of the potentiometer, in such a manner as to modify the electrical resistance of said potentiometer while the graspable body and the stress member are pivoting relative to each other.

Such a design for the tension meter makes it possible, by applying a pivoting force to the graspable body 10, to mesh the toothed wheel 17 formed by said graspable body 10 with the gear wheel 7 of the potentiometer 16 over an angular sector corresponding to the relative pivoting between the graspable body 10 and the stress member 2, which sector is representative of the state of tension of the string.

The gear wheel 7 turning by meshing modifies the electrical resistance of the potentiometer 16, thereby making it possible to deduce the value of the tension of the string.

The relative pivoting between the graspable body and the stress member corresponds to the angle through which the gear wheel 7 of the potentiometer 16 turns resulting from the meshing between the toothed wheel 17 and the gear wheel 7 following the pivot movement applied by the operator to the graspable body 10.

In the neutral position, the control shaft of the rotary tension meter is situated substantially in the middle of the angular sector defined between the end angular positions that the potentiometer can take up in either direction of pivoting relative to said return neutral position.

Preferably, said toothed wheel 17 and the graspable body 10 are formed in one piece.

The graspable body 10 is in the general shape of a toothed wheel provided, on its "top face", i.e. on its face opposite from the stress member 2, with two graspable elements 11 that are opposite each other about the axis of the toothed wheel, corresponding to the pivot axis ROT1. Said graspable elements 11 enable the operator to apply a pivot force to the graspable body 10 in either direction.

The toothed wheel has a through axial orifice for passing a connection member 12 designed to hold the graspable body 10 coupled to the stress member 2, while also allowing said graspable body 10 to pivot relative to the stress member 2. Naturally, the pivoting of the graspable body 10 relative to the stress member 2 is limited by the deformable element 3. Said connection means are formed by a screw 12, the thread of which co-operates with the tapped portion 28 provided in the stress member 2. A washer 18 placed over the screw 12 is interposed between the screw head 12 and the graspable body 10 through which the screw 12 passes in order to enable the screw head 12 to bear against the top face of said graspable body 10.

In general, a portion 3A, 3B of the deformable element 3 is fastened to the graspable body 10 and another portion 3C, 3D of the deformable element 3 is fastened to the stress member 2. In particular, said deformable element 3 includes a portion 3A, 3B connected to the graspable body 10 at two points that are opposite each other about the pivot axis ROT1 of said graspable body, and another portion 3C, 3D connected to the stress member 2 at two points that are opposite each other about the pivot axis ROT1 of said graspable body. Said graspable body 10, the stress member 2, and the deformable element 3 share a common axis that is parallel to and that preferably coincides with the axis ROT1 about which the graspable body 10 of the tension meter is pivoted.

In the example shown in FIGS. 5 to 8, said deformable element 3 is in the form of a body having four lobes 3A, 3B, 3C, 3D disposed substantially at 90° relative to one another about the pivot axis of the graspable body. Said body of the deformable element 3 is centrally hollow so as to make it possible to pass the connection means 12 for connecting the graspable body 10 to the stress member 2. The lobes 3A, 3B, 3C, 3D are provided with through holes to define recesses for receiving pins 14, 15, 33, 34 present, in register with the lobes 3A & 3B, on the graspable body 10 and, in register with the lobes 3C & 3D, on the stress member 2. In particular, the pins 14 & 15 of the graspable body 10 are designed to engage in the orifices in the lobes 3A & 3B, and the pins 33 & 34 of the stress member 2 are designed to engage in the orifices in the lobes 3C & 3D.

In other words, the deformable element 3 is in the general shape of a cross, one branch 3A, 3B of which is fastened at or in the vicinities of its ends to the graspable body 10, and the other branch 3C, 3D of which is fastened at or in the vicinities of its ends to the stress member 2.

The deformable element is made of elastomer, and preferably of styrene-ethylene/butylene-styrene (SEBS).

The branches 3A, 3B and 3C, 3D are centered on the pivot axis ROT1.

The potentiometer forms means for converting into electrical signals the relative pivoting between the graspable body and the stress member or indeed the deformation to which the deformable element is subjected. In particular, the turning movement in which the gear wheel 7 is constrained to move by the toothed wheel 17 while the graspable body is pivoting relative to the stress member is representative of the deformation by flexing of the branch 3A, 3B of the deformable element 3, which deformation is, itself, representative of the tension of the string. The flexing axis of the branch 3A, 3B of the deformable element 3 is parallel to the pivot axis ROT1, i.e. orthogonal to the mean plane of the strings.

In the embodiment shown in FIGS. 9 to 11, said return means 3 are formed by a flexible element. Said flexible element 3 is a flexible blade. In the non-stressed state, the mean plane of the flexible blade 3 is parallel to the pivot axis ROT1 of the graspable body. As described in detail below, said measurement means include at least one strain gauge 35.

Said graspable body of the tension meter is designed to be turned about said pivot axis ROT1 until said graspable body has a predefined given angular position relative to the string, which angular position is referred to as the "stress angular position", in which the string is stressed by being deformed. Thus, in order to measure the tension of the racquet string, the flexing of the flexible element is measured once the graspable body 10 has been turned about the pivot axis ROT1 to obtain the desired angular position of said graspable body 10 relative to the string 9.

Said stress angular position may correspond to the straight line passing through two distinct points of the graspable body 10 being superposed on the straight line passing through the string 9. Said points of the graspable body 10 serving as references, for alignment with the string 9, are the two opposite connection zones in which the flexible element 3 is connected to the graspable body 10. Said stress angular position may also correspond to a given angle of pivoting of the graspable body relative to a configuration in which the bearing elements 21, 22 are bearing against the string 9.

The pivoting of the graspable body 10 about an axis ROT1 orthogonal to the string 9 and in the midplane passing through the bearing elements 21, 22 of the stress member generates firstly torque from the stress member on the string by the two bearing elements 21, 22 bearing in opposite directions on the string, and secondly deformation by the flexible element 3 flexing so as to follow the pivoting of the graspable body 10 while the stress member 2 is in engagement with the string.

During the pivoting of the graspable body 10, the two bearing elements 21, 22 exert torque on the string 9 that deforms the string to an extent varying as a function of its initial tension, i.e. its tension in the absence of stress. Since the flexing of the flexible element 3 depends on the deformation of the string 9, i.e. on the capacity of the stress member 2 to follow the pivoting movement of the graspable body 10, the measurement of the flexing of the flexible element 3 makes it possible to determine the initial tension of the string 9.

The slacker the string 9 is initially, the more it tends to deform easily under the effect of the torque applied by the stress member 2 when the graspable body 10 is turned in the configuration in which it stresses the string 9. The flexible element 3 that connects the graspable body 10 to the stress member 2 in engagement with the string 9 then only needs to flex to a small extent in order to follow the pivoting movement of the graspable body 10.

Conversely, the tauter the string 9 is initially, the more it resists the torque applied by the stress member 2 when the graspable body 10 is turned to reach the desired angular position relative to the string 9. As a result, the flexible element 3 that connects the graspable body 10 to the stress member 2 in engagement with the string 9 then needs to flex to a large extent about its flexing axis that is parallel to the pivot axis ROT1 in order to follow the pivoting movement of the graspable body 10.

The pivot axis ROT1 is orthogonal to the plane of the strings, thereby making it easy to apply torque via the stress member 2 to a string 9 inside the racquet frame with a large degree of freedom, and facilitating manipulating the tension meter. The flexible blade 3 is then arranged in such a manner that its flexing axis is parallel to the pivot axis ROT1, i.e. orthogonal to the mean plane of the strings.

By choosing to make provision for the pivot axis ROT1 of the graspable body to be orthogonal to the plane of the strings, for the purpose of deforming the string, it is possible to design the stress member in the form of two prongs that are cylindrical in general shape, and that are spaced apart from each other and interconnected via a support or plate 20, and that merely need to be positioned directly astride a string. The prongs 21, 22 extend projecting from the plate 20 while being spaced apart from each other in a direction orthogonal to their projection direction in such a manner as to be placed astride a string. When the stress member is positioned astride the string, the plate 20 that interconnects the two prongs extends on one side of the racquet frame, thereby facilitating positioning of the two prongs 21, 22 on either side of the string 9, and thus facilitating manipulation of the tension meter. In particular, the user can easily turn the graspable body about the desired axis without being hindered by the strings.

The two bearing elements 21, 22 of the stress member 2 extend substantially parallel to each other and orthogonally to the mean plane of said graspable body 10 or indeed to the mean plane of the plate 20.

In the example shown in FIGS. 9 to 11, said at least one strain gauge is positioned on one face of the flexible blade 3.

In a variant, it is possible to make provision to distribute at least one strain gauge on each of the faces of the flexible blade 3.

In particular, said at least one strain gauge is positioned in the middle portion of the flexible blade 3 that is situated between the stress member 2 and one (3B) of the two ends 3A, 3B of the blade 3 that is connected to the graspable body 10, as described in detail below.

It is in this zone that the deformation by flexing is the greatest. In a variant, said measurement means may be distributed on each of the two portions of the flexible blade 3 that are defined between the stress member 2 and an end of the flexible blade that is connected to the graspable body 10.

Said at least one strain gauge may also be referred to as an "extensometer gauge". The or each strain gauge forms means for converting the deformation by flexing to which the blade is subjected, and thus the relative pivoting between the graspable body and the stress member, into electrical signals that the computation means can acquire.

In particular, said computation means connected to said at least one strain gauge acquire a resistance value that is variable as a function of the deformation by flexing of the blade. Said computation means may be positioned in or on the graspable body.

The graspable body 10 is an annular body, e.g. it is ellipsoidal in shape. The pivoting axis ROT1 of the graspable body is orthogonal to the mean plane of said graspable body.

The flexible element 3 extends inside the space defined by said annular graspable body 10. The opposite ends 3A, 3B of the flexible element 3 are connected to two distinct points of the annular graspable body 10, preferably to two diametrically opposite points. The stress member 2 is fastened to the flexible element 3 between and spaced apart from the two ends 3A, 3B of the flexible element 3, preferably in the middle zone of the length of said flexible element 3.

The flexible element 3 has a longitudinal axis A3 that is orthogonal to its flexing axis. In the example shown in FIGS. 9 to 11, said measurement means are situated between the stress member 2 and one (3B) of the ends 3A, 3B of the flexible element that is connected to said graspable body, preferably in the middle of the length between the stress member 2 and said end 3B of said flexible element 3.

The flexible element 3 carries the stress member 2 between its two ends 3A, 3B, preferably half way along the length of said flexible element 3.

The opposite ends of the flexible element 3 are connected to the graspable body 10 at two opposite points or zones of the graspable body. At least one and preferably each end 3A, 3B of the flexible elongate element, which end is spaced apart from the stress member 2, is coupled to the graspable body 10 in such a manner firstly as to allow said flexible element 3 axial clearance relative to said graspable body 10 (i.e. along the longitudinal axis of the flexible element when said element is in the non-flexed state) in order to absorb the variations in distance between the two ends 3A, 3B of the flexible element 3 while it is flexing, and secondly as to prevent said at least one end 3A, 3B from moving in a direction transverse to the axis of said flexible element 3. Said direction transverse to the axis is taken with said flexible element 3 in the non-stressed state, so as to enable said element to flex when the graspable body 10 is turned by the operator about said pivot axis ROT1.

Thus, it is possible to make provision for one of the ends 3A, 3B or for each end 3A, 3B of the flexible element to be received in a slot, provided in the graspable body, the sides of which slot sandwich the side portions of the end portion 3A, 3B of the flexible element received in said slot, while said end portion 3A, 3B of the flexible element is suitable for being pushed in to various extents into the slot as a function of its deformation by flexing.

The longitudinal axis A3 of the flexible blade 3 is substantially coplanar with the pivot axis ROT1 of the graspable body 10 defined by the axis that is contained in the midplane passing through said bearing elements 21, 22 designed to straddle the string 9 and that is perpendicular to the axis of the string passage defined between the two bearing elements 21, 22. The longitudinal axis A3 of the blade extends substantially orthogonally to the pivot axis ROT1 of the graspable body or of the stress member 2. In the example shown in FIGS. 9 to 11, the mean plane of the blade substantially coincides with the mean plane that contains the longitudinal axes of the two prongs 21, 22.

In the neutral position the or each strain gauge is not subjected to any deformation stress. The or each strain gauge can follow the flexing of the flexible element in either direction so as to deform in one direction of flexing of the flexible element and in the other direction so as to follow the flexing of said flexible element.

Advantageously, said tension meter is provided with means for initializing the computation means.

The present invention is in no way limited to the embodiments described and shown, and the person skilled in the art can make any variant to them that lies within the spirit of the invention.

The invention claimed is:

1. An individual tension meter for measuring tension in a racquet string, said tension meter comprising:
    a graspable body to be taken hold of in a hand;
    a stress member configured to stress the string by deforming said string, said stress member including at least two bearing elements spaced apart from each other, the at least two bearing elements being one or more of studs, fingers and prongs, the at least two bearing elements being positionable on either side of the individual string, said graspable body and said stress member being movable relative to each other substantially in a pivotal relative movement;
    elastically deformable return means connected to the graspable body and to the stress member for stressing the string, and configured to urge the graspable body and the stress member relative to each other back into a given angular position, the given angular position being a neutral position;
    measurement means for measuring a magnitude representative of the relative pivoting between the graspable body and the stress member;
    computation means for computing the tension of the string as a function of said measured magnitude; and
    activation and deactivation means for activating and deactivating said computation means as a function of the angle of relative pivoting between the graspable body and the stress member,
    wherein the graspable body and the stress member have two possibilities of pivoting relative to each other and relative to said neutral position, the two pivoting possibilities including a first possibility of pivoting in a first direction adapted to a right-hander, and a second possibility of pivoting in a second direction adapted to a left-hander, opposite from the first direction, and
    the computation means are formed by an electronic and computer system, the electronic and computer system being a microprocessor, the computation means being configured to compute the tension of said string both when the stress member and the graspable body are pivoted relative to each other in the first direction, and when the stress member and the graspable body are pivoted relative to each other in said second direction.

2. The tension meter according to claim 1, wherein measurement means comprise
    first measurement means for measuring a magnitude representative of the relative pivoting between the graspable body and the stress member in said first direction relative to said neutral position, and
    second measurement means for measuring a magnitude representative of the relative rotation between the graspable body and the stress member in said second direction relative to said neutral position.

3. The tension meter according to claim 1, wherein the return means have a first possibility of deforming in a direction corresponding to said first direction of pivoting of the graspable body relative to the stress member, and a second possibility of deforming in a direction corresponding to said second direction of pivoting of the graspable body relative to the stress member.

4. The tension meter according to claim 1, wherein, relative to each other, and on either side of the neutral position, the graspable body and the stress member have an angular movement stroke of not less than 10°.

5. The tension meter according to claim 1, wherein, in the state in which the two bearing elements of said stress member are positioned on either side of the string, said return means and the stress member are arranged in such a manner that a midplane passing through said bearing elements on either side of the string forms, in the neutral position, a plane of symmetry for said return means and/or a plane in which said return means extends.

6. The tension meter according to claim 1, wherein, when the graspable body pivots relative to the stress member in one direction through a given angle relative to the neutral position, said return means have, in absolute terms, a deformation stroke that is substantially identical to the deformation stroke that the return means has when the graspable body pivots in the other direction relative to the stress member through said given angle relative to the neutral position.

7. The tension meter according to claim 1, wherein measurement means comprise a linear potentiometer having a variable linear resistive element and an adjustment member or slide configured to adjust said resistive element, said slide being movable along at least a portion of said variable linear resistive element, said variable linear resistive element and said slide being coupled to the graspable body, and to the stress member.

8. An individual tension meter for measuring tension in a racquet string, said tension meter comprising:
    a graspable body to be taken hold of in a hand;
    a stress member configured to stress the string by deforming said string, said stress member including at least two bearing elements spaced apart from each other, the at least two bearing elements being one or more of studs, fingers, and prongs, the at least two bearing elements being positionable on either side of the individual string, said graspable body and said stress member being movable relative to each other substantially in a pivotal relative movement;
    elastically deformable return means connected to the graspable body and to the stress member for stressing the string, and configured to urge the graspable body and the stress member relative to each other back into a given angular position, the given angular position being a neutral position;

measurement means for measuring a magnitude representative of the relative pivoting between the graspable body and the stress member; and computation means for computing the tension of the string as a function of said measured magnitude, wherein the graspable body and the stress member have two possibilities of pivoting relative to each other and relative to said neutral position, the two pivoting possibilities including a first possibility of pivoting in a first direction adapted to a right-hander, and a second possibility of pivoting in a second direction adapted to a left-hander, opposite from the first direction, the computation means are formed by an electronic and computer system, the electronic and computer system being a microprocessor, the computation means being configured to compute the tension of said string both when the stress member and the graspable body are pivoted relative to each other in the first direction, and when the stress member and the graspable body are pivoted relative to each other in said second direction, said measurement means comprise a linear potentiometer having a variable linear resistive element and an adjustment member or slide configured to adjust said resistive element, said slide being movable along at least a portion of said variable linear resistive element, said variable linear resistive element and said slide being coupled to the graspable body and to the stress member, said stress member comprises an arm mounted to pivot relative to the graspable body, and said return means comprises two helical springs optionally formed in one piece, that extend on either side of the axis of the arm, at or in the vicinity of the free end of said arm.

9. The tension meter according to claim 8, wherein the arm is provided with means for coupling to the slide of the potentiometer, said coupling means being configured in such a manner as to cause the slide to move in the direction of pivoting of the arm while also leaving the slide free to move over a given stroke along the axis of said arm.

10. The tension meter according to claim 1, wherein said measurement means comprises a rotary potentiometer that has a variable resistive element and a rotary control shaft configured to cause the resistance of said resistive element to vary, said variable resistive element and the control shaft being coupled to the stress member and to the graspable body.

11. An individual tension meter for measuring tension in a racquet string, said tension meter comprising:

a graspable body to be taken hold of in a hand;

a stress member configured to stress the string by deforming said string, said stress member including at least two bearing elements spaced apart from each other, the at least two bearing elements being one or more of studs, fingers, and prongs, the at least two bearing elements being positionable on either side of the individual string, said graspable body and said stress member being movable relative to each other substantially in a pivotal relative movement;

elastically deformable return means connected to the graspable body and to the stress member for stressing the string, and configured to urge the graspable body and the stress member relative to each other back into a given angular position, the given angular position being a neutral position;

measurement means for measuring a magnitude representative of the relative pivoting between the graspable body and the stress member; and computation means for computing the tension of the string as a function of said measured magnitude, wherein the graspable body and the stress member have two possibilities of pivoting relative to each other and relative to said neutral position, the two pivoting possibilities including a first possibility of pivoting in a first direction adapted to a right-hander, and a second possibility of pivoting in a second direction adapted to a left-hander, opposite from the first direction, the computation means are formed by an electronic and computer system, the electronic and computer system being a microprocessor, the computation means being configured to compute the tension of said string both when the stress member and the graspable body are pivoted relative to each other in the first direction, and when the stress member and the graspable body are pivoted relative to each other in said second direction, said measurement means comprise a rotary potentiometer that has a variable resistive element and a rotary control shaft configured to cause the resistance of said resistive element to vary, said variable resistive element and the control shaft being coupled to the stress member and to the graspable body, and said return means include a portion connected to the graspable body at two opposite points about the pivot axis corresponding to the pivotability of the graspable body relative to the stress member, and another portion connected to the stress member at two opposite points about said pivot axis.

12. An individual tension meter for measuring tension in a racquet string, said tension meter comprising:

a graspable body to be taken hold of in a hand;

a stress member configured to stress the string by deforming said string, said stress member including at least two bearing elements spaced apart from each other, the at least two bearing elements being one or more of studs, fingers, and prongs, the at least two bearing elements being positionable on either side of the individual string, said graspable body and said stress member being movable relative to each other substantially in a pivotal relative movement;

elastically deformable return means connected to the graspable body and to the stress member for stressing the string, and configured to urge the graspable body and the stress member relative to each other back into a given angular position, the given angular position being a neutral position;

measurement means for measuring a magnitude representative of the relative pivoting between the graspable body and the stress member; and computation means for computing the tension of the string as a function of said measured magnitude, wherein the graspable body and the stress member have two possibilities of pivoting relative to each other and relative to said neutral position, the two pivoting possibilities including a first possibility of pivoting in a first direction adapted to a right-hander, and a second possibility of pivoting in a second direction adapted to a left-hander, opposite from the first direction, the computation means are formed by an electronic and computer system, the electronic and computer system being a microprocessor, the computation means being configured to compute the tension of said string both when the stress member and the graspable body are pivoted relative to each other in the first direction, and when the stress member and the graspable body are pivoted relative to each other in said second direction, the return means comprise a flexible element, the flexible element being constituted by a flexible blade, and said measurement means comprise at least one strain gauge positioned on said flexible element.

13. The tension meter according to claim 12, wherein the opposite ends of said blade are connected to two distinct points of the graspable body that are diametrically opposite about the pivot axis corresponding to the pivotability of the graspable body relative to the stress member.

14. An individual tension meter for measuring tension in a racquet string, said tension meter comprising:
a graspable body to be taken hold of in a hand;
a stress member configured to stress the string by deforming said string, said stress member including at least two bearing elements spaced apart from each other, the at least two bearing elements being one or more of studs, fingers, and prongs, the at least two bearing elements being positionable on either side of the individual string, said graspable body and said stress member being movable relative to each other substantially in a pivotal relative movement;
elastically deformable return means connected to the graspable body and to the stress member for stressing the string, and configured to urge the graspable body and the stress member relative to each other back into a given angular position, the given angular position being a neutral position;
measurement means for measuring a magnitude representative of the relative pivoting between the graspable body and the stress member; and
computation means for computing the tension of the string as a function of said measured magnitude,
wherein the graspable body and the stress member have two possibilities of pivoting relative to each other and relative to said neutral position, the two pivoting possibilities including a first possibility of pivoting in a first direction adapted to a right-hander, and a second possibility of pivoting in a second direction adapted to a left-hander, opposite from the first direction,
the computation means are formed by an electronic and computer system, the electronic and computer system being a microprocessor, the computation means being configured to compute the tension of said string both when the stress member and the graspable body are pivoted relative to each other in the first direction, and when the stress member and the graspable body are pivoted relative to each other in said second direction,
the tension meter is equipped with detection means for detecting the string, the detection means being configured to transmit a control signal when the detection means are situated in line with said string, the control signal causing said magnitude measured by said measurement means to be stored in a memory.

15. The tension meter according to claim 2, wherein the return means have a first possibility of deforming in a direction corresponding to said first direction of pivoting of the graspable body relative to the stress member, and a second possibility of deforming in a direction corresponding to said second direction of pivoting of the graspable body relative to the stress member.

16. The tension meter according to claim 2, wherein, relative to each other, and on either side of the neutral position, the graspable body and the stress member have an angular movement stroke of not less than 10°.

17. The tension meter according to claim 2, wherein, in the state in which the two bearing elements of said stress member are positioned on either side of the string, said return means and the stress member are arranged in such a manner that a midplane passing through said bearing elements on either side of the string forms, in the neutral position, a plane of symmetry for said return means and/or a plane in which said return means extends.

18. The tension meter according to claim 2, wherein, when the graspable body pivots relative to the stress member in one direction through a given angle relative to the neutral position, said return means have, in absolute terms, a deformation stroke that is substantially identical to the deformation stroke that the return means has when the graspable body pivots in the other direction relative to the stress member through said given angle relative to the neutral position.

19. An individual tension meter for measuring tension in a racquet string, said tension meter comprising:
a graspable body to be taken hold of in a hand;
a stress member configured to stress the string by deforming said string, said stress member including at least two bearing elements spaced apart from each other, the at least two bearing elements being one or more of studs, fingers, and prongs, the at least two bearing elements being positionable on either side of the individual string, said graspable body and said stress member being movable relative to each other substantially in a pivotal relative movement;
elastically deformable return means connected to the graspable body and to the stress member for stressing the string, and configured to urge the graspable body and the stress member relative to each other back into a given angular position, the given angular position being a neutral position;
measurement means for measuring a magnitude representative of the relative pivoting between the graspable body and the stress member; and
computation means for computing the tension of the string as a function of said measured magnitude,
wherein the graspable body and the stress member have two possibilities of pivoting relative to each other and relative to said neutral position, the two pivoting possibilities including a first possibility of pivoting in a first direction adapted to a right-hander, and a second possibility of pivoting in a second direction adapted to a left-hander, opposite from the first direction,
the computation means are formed by an electronic and computer system, the electronic and computer system being a microprocessor, the computation means being configured to compute the tension of said string both when the stress member and the graspable body are pivoted relative to each other in the first direction, and when the stress member and the graspable body are pivoted relative to each other in said second direction,
wherein the arm is provided with means for coupling to the slide of the potentiometer, said coupling means being configured in such a manner as to cause the slide to move in the direction of pivoting of the arm while also leaving the slide free to move over a given stroke along the axis of said arm.

* * * * *